US012393132B2

(12) United States Patent
Fujita et al.

(10) Patent No.: US 12,393,132 B2
(45) Date of Patent: Aug. 19, 2025

(54) GREEN TONER FOR ELECTROSTATIC CHARGE IMAGE DEVELOPMENT, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Asafumi Fujita, Kanagawa (JP); Tomoaki Tanaka, Kanagawa (JP); Kotaro Yoshihara, Kanagawa (JP); Tsuyoshi Murakami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/640,561

(22) Filed: Apr. 19, 2024

(65) Prior Publication Data

US 2025/0147443 A1 May 8, 2025

(30) Foreign Application Priority Data

Nov. 4, 2023 (JP) ................................ 2023-193886

(51) Int. Cl.

*G03G 9/09* (2006.01)
*G03G 9/097* (2006.01)
*G03G 15/08* (2006.01)
*G03G 15/20* (2006.01)

(52) U.S. Cl.

CPC ........... *G03G 9/09* (2013.01); *G03G 9/09725* (2013.01); *G03G 15/0868* (2013.01); *G03G 15/2014* (2013.01); *G03G 2215/066* (2013.01)

(58) Field of Classification Search

CPC .. G03G 9/09; G03G 9/09725; G03G 15/0868; G03G 15/2014; G03G 2215/066

See application file for complete search history.

(56) References Cited

U.S. PATENT DOCUMENTS

| | | | | |
|---|---|---|---|---|
| 2008/0261141 A1* | 10/2008 | Yasukawa | G03G 9/092 430/108.2 |
| 2011/0207037 A1* | 8/2011 | Yasukawa | G03G 9/0912 430/42.1 |
| 2023/0384699 A1* | 11/2023 | Nakamura | G03G 9/0918 |

FOREIGN PATENT DOCUMENTS

| | | |
|---|---|---|
| JP | 2011-128414 A | 6/2011 |
| JP | 2012-189989 A | 10/2012 |
| JP | 2016-17135 A | 2/2016 |

(Continued)

*Primary Examiner* — Joseph S Wong

(74) *Attorney, Agent, or Firm* — Sughrue Mion, PLLC

(57) ABSTRACT

A green toner for electrostatic charge image development includes green toner particles containing a binder resin, an azomethine fluorescent pigment having an emission peak in a wavelength region of 500 nm or more and 550 nm or less in an emission spectrum, and a non-fluorescent pigment having a reflection peak in a wavelength region of 480 nm or more and 540 nm or less in a reflection spectrum, wherein a mass proportion of the azomethine fluorescent pigment in the green toner particles is 3% by mass or more and 10% by mass or less and a mass ratio M1/M2 of a content M1 of the azomethine fluorescent pigment to a content M2 of the non-fluorescent pigment is 1 or more and 5 or less; and oil-treated silica particles externally added to the green toner particles.

20 Claims, 2 Drawing Sheets

(56) References Cited

FOREIGN PATENT DOCUMENTS

| | | | |
|---|---|---|---|
| JP | 2016-224339 | A | 12/2016 |
| JP | 2017-3818 | A | 1/2017 |
| JP | 2023-45265 | A | 4/2023 |

* cited by examiner

GREEN TONER FOR ELECTROSTATIC CHARGE IMAGE DEVELOPMENT, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2023-193886 filed Nov. 14, 2023.

BACKGROUND

(i) Technical Field

The present disclosure relates to a green toner for electrostatic charge image development, an electrostatic charge image developer, a toner cartridge, a process cartridge, an image forming apparatus, and an image forming method.

(ii) Related Art

Japanese Unexamined Patent Application Publication No. 2012-189989 discloses a green toner for electrostatic charge image development containing C.I. Solvent Green 5 and a phthalocyanine-based colorant compound X, in which the content of C.I. Solvent Green 5 in the total amount of colorants is 5% by mass or more and 50% by mass or less.

Japanese Unexamined Patent Application Publication No. 2016-017135 discloses a colorant composition containing a copper phthalocyanine pigment, a fluorescent dye, and a resin binder, in which the hue angle of a coated product of the composition on white paper is 236° or less and the fluorescent dye enables the visible reflection spectrum of a coating film that is formed of the fluorescent dye and the resin binder but does not contain the copper phthalocyanine pigment to have a maximum reflectance of 90% to 130%.

Japanese Unexamined Patent Application Publication No. 2011-128414 discloses a toner for electrostatic charge image development containing a yellow-based non-fluorescent dye of which the peak wavelength in the absorption spectrum is in a wave region of 400 to 480 nm and a fluorescent dye of which the peak wavelength in the emission spectrum is in a wave region of 480 to 560 nm, in which the content of the non-fluorescent dye is 2 to 8 parts by mass with respect to 100 parts by mass of the binder resin, the content of the fluorescent dye is 0.05 to 0.2 parts by mass with respect to 100 parts by mass of the binder resin, and the content ratio represented by an expression (content of non-fluorescent dye/content of fluorescent dye) is in a range of 15 to 150.

Japanese Unexamined Patent Application Publication No. 2017-003818 discloses a toner that satisfies $W_G \times 0.5 > W_F > W_G \times 0.025$, where $W_G$ and $W_F$ denote the mass-based content of a coloring pigment and the mass-based content of a fluorescent dye, respectively, and satisfies $P_G < P_F$, where $P_G$ denotes the absorption peak wavelength of the coloring pigment and $P_F$ denotes the emission peak wavelength of the fluorescent dye.

Japanese Unexamined Patent Application Publication No. 2016-224339 discloses a toner for electrostatic charge image development containing toner particles, which contain a binder resin including a polyester resin and a styrene (meth) acrylic resin and have a domain with an average size of 300 nm or more and 800 nm or less formed by the styrene (meth)acrylic resin therein, and oil-treated silica particles having a free oil amount of 3% by mass or more and 30% by mass or less.

Japanese Unexamined Patent Application Publication No. 2023-045265 discloses a photoluminescent toner containing photoluminescent toner particles that contain a binder resin, a release agent, and a photoluminescent pigment and have a release agent domain, and silicone oil-treated silica particles, in which the average major axis length Dw of the release agent domain and the average major axis length Dp of the photoluminescent pigment satisfy Expression (1): $0.3 \leq Dw/Dp \leq 1.0$ in cross-sectional observation of the photoluminescent toner particles.

SUMMARY

An image display section of an electronic device is generally in a so-called RGB color mode in which a color is expressed by a combination of three colors of red (R), green (G), and blue (B).

Meanwhile, electrophotographic image formation is generally performed in a so-called CMYK color mode in which a color is expressed by a combination of four colors of cyan (C), magenta (M), yellow (Y), and black (K).

When an image expressed in the RGB color mode is reproduced on a recording medium in the CMYK color mode, a secondary color such as green, pink, or orange tends to become dull.

A green toner, a pink toner, or an orange toner has been developed for the purpose of enhancing color reproducibility of green, pink, or orange in electrophotographic image formation. As the green toner, a toner containing a yellow fluorescent dye (for example, C.I. Solvent Green 5)) and a green pigment or a blue pigment is known.

However, since a fluorescent dye generally causes concentration quenching in which light emission is attenuated as the concentration increases, it is difficult to reproduce a color having higher brightness and higher chroma with a green toner containing a fluorescent dye.

For the purpose of achieving reproduction of a color having high brightness and high chroma, development of a green toner in which a fluorescent dye is replaced with a fluorescent pigment has been advanced.

However, since the crystals of fluorescent pigments have relatively low electrical resistance, the green toner containing a fluorescent pigment is less likely to be triboelectrically charged. When the toner is charged at a low level, fogging (a phenomenon in which the toner adheres to a non-image area of a recording medium) occurs. Fogging is conspicuous in a case where the time during which the toner stays in the developing device is short (that is, the time during which the toner is stirred is short) as when high-density images are continuously output.

Aspects of non-limiting embodiments of the present disclosure relate to a green toner for electrostatic charge image development that is less likely to cause fogging than a green toner for electrostatic charge image development to which oil-treated silica particles are not externally added.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a green toner for electrostatic charge image development including green toner particles containing a binder resin, an azomethine fluorescent pigment having an emission peak in a wavelength region of 500 nm or more and 550 nm or less in an emission spectrum, and a non-fluorescent pigment having a reflection peak in a wavelength region of 480 nm or more and 540 nm or less in a reflection spectrum, in which a mass proportion of the azomethine fluorescent pigment in the green toner particles is 3% by mass or more and 10% by mass or less and a mass ratio M1/M2 of a content M1 of the azomethine fluorescent pigment to a content M2 of the non-fluorescent pigment is 1 or more and 5 or less; and oil-treated silica particles externally added to the green toner particles.

BRIEF DESCRIPTION OF THE DRAWINGS

Exemplary embodiments of the present disclosure will be described in detail based on the following figures, wherein.

DETAILED DESCRIPTION

Figure 1:
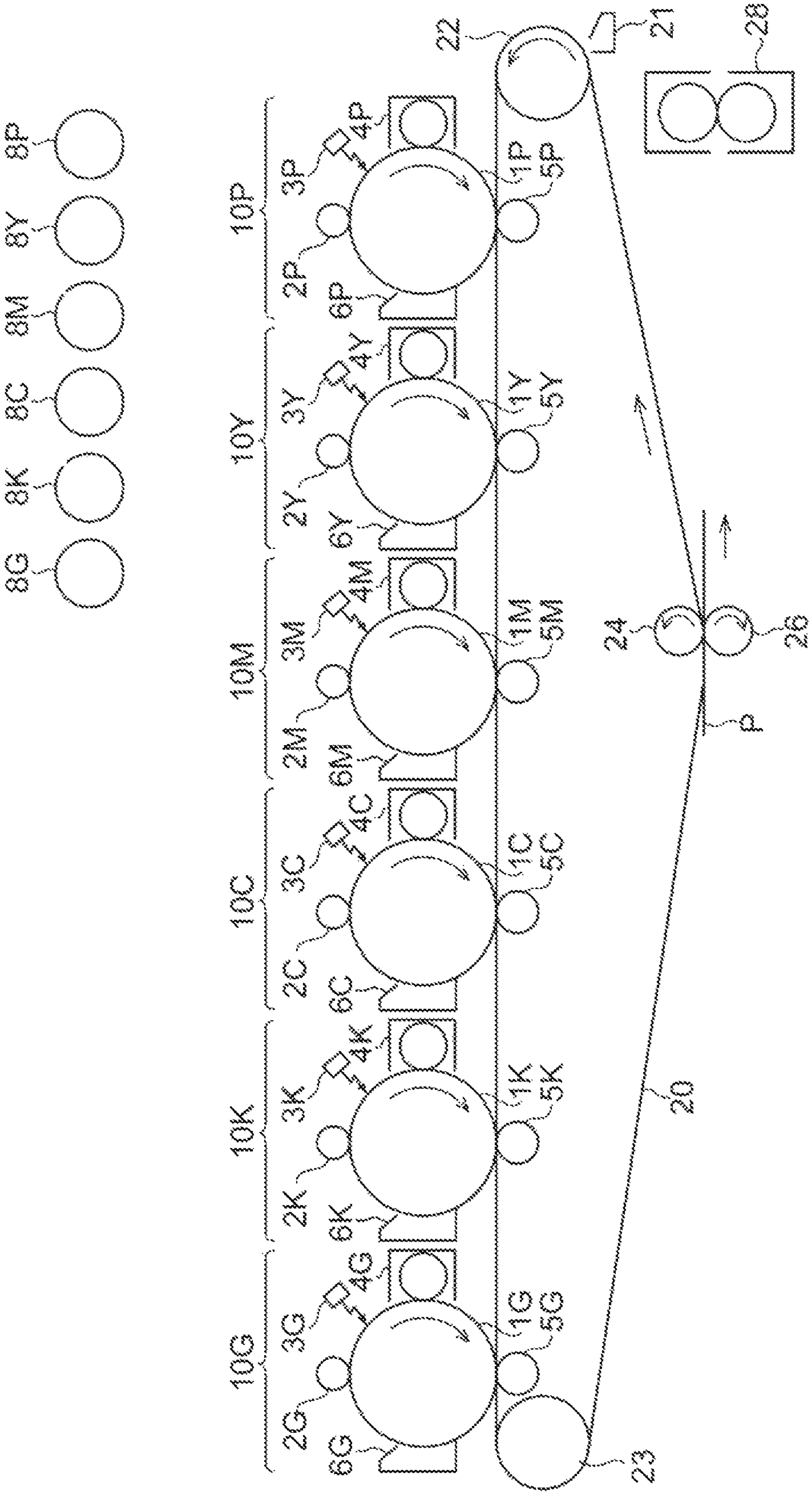
FIG. 1 is a schematic configuration diagram illustrating an example of an image forming apparatus according to the present exemplary embodiment.

Hereinafter, exemplary embodiments of the present disclosure will be described. The description of these and Examples are illustrative of exemplary embodiments and are not intended to limit the scope of the exemplary embodiments.

In the present disclosure, "A and/or B" is synonymous with "at least one of A and B". In other words, it means that "A and/or B" may be A, may be B, or may be a combination of A and B.

In the present disclosure, a numerical range indicated by using "to" indicates a range including the numerical values before and after "to" as the minimum and maximum values, respectively.

In the numerical ranges described stepwise in the present disclosure, the upper limit value or lower limit value described in one numerical range may be replaced with the upper limit value or lower limit value of another numerical range described stepwise. In a numerical range described in the present disclosure, the upper limit value or lower limit value in the numerical range may be replaced with a value presented in Examples.

In the present disclosure, the term "step" includes not only an independent step but also a step that cannot be clearly distinguished from another step as long as the purpose of the step is achieved.

When an exemplary embodiment of the present disclosure is described with reference to the drawings, the configuration of the exemplary embodiment is not limited to the configuration illustrated in the drawings. The sizes of the members in the respective drawings are conceptual, and the relative relation in size between the members is not limited thereto.

In the present disclosure, each component may contain a plurality of kinds of corresponding substances. In the present disclosure, when referring to the amount of each component in a composition, in a case where a plurality of kinds of substances corresponding to each component are present in the composition, the amount means the total amount of the plurality of kinds of substances present in the composition unless otherwise stated.

In the present disclosure, particles corresponding to each component may include a plurality of kinds. In a case where a plurality of kinds of particles corresponding to each component are present in a composition, the particle size of each component means a value for a mixture of the plurality of kinds of particles present in the composition unless otherwise stated.

In the present disclosure, when a compound is represented by a structural formula, the compound may be represented by a structural formula in which symbols (C and H) representing a carbon atom and a hydrogen atom in a hydrocarbon group and/or a hydrocarbon chain are omitted.

In the present disclosure, the term "(meth)acryl" is an expression that includes both acryl and methacryl, and the term "(meth)acrylate" is an expression that includes both acrylate and methacrylate.

In the present disclosure, the "toner for electrostatic charge image development" is also referred to as "toner", the "green toner for electrostatic charge image development" is also referred to as "green toner", the "electrostatic charge image developer" is also referred to as "developer", and the "carrier for electrostatic charge image development" is also referred to as "carrier".

In the present disclosure, the Colour Index is abbreviated as "C.I."

<Green Toner for Electrostatic Charge Image Development>

In the present disclosure, the green toner means a toner in which the hue angle h of a solid image (an image having a density of 100%) formed on coated paper is 128.5° or more and 144.5° or less. The hue angle h is an angle calculated from a* and b* values in the CIE1976 L*a*b* color space by the following equation.

$$\text{Hue angle } h = \tan^{-1}(b^*/a^*)$$

In the present disclosure, the hue angle h of the solid image formed on the coated paper using the green toner is preferably 131° or more and 143° or less, more preferably 135° or more and 140° or less.

In the present disclosure, a solid image (an image having a density of 100%) formed on coated paper using the green toner preferably has a brightness L* of 70 or more and a chroma C* of 85 or more in the CIE1976 L*a*b* color space. The chroma C* is a value calculated from a* and b* values in the CIE1976 L*a*b* color space by the following equation.

$$\text{Chroma } C^* = \{(a^*)^2 + (b^*)^2\}^{0.5}$$

In the present disclosure, the fluorescent pigment refers to a pigment that emits light by light energy from the outside, and the non-fluorescent pigment refers to a pigment that does not emit light by light energy from the outside. In general, a fluorescent pigment exhibits a color by reflected light and emitted light, and a non-fluorescent pigment exhibits a color only by reflected light.

The green toner according to the present exemplary embodiment contains green toner particles. The green toner particles contain a binder resin, an azomethine fluorescent pigment having an emission peak in a wavelength region of 500 nm or more and 550 nm or less in the emission spectrum, and a non-fluorescent pigment having a reflection peak in a wavelength region of 480 nm or more and 540 nm or less in the reflection spectrum.

In other words, the green toner particles in the present exemplary embodiment are toner particles containing a yellow fluorescent pigment and a green pigment or a blue pigment.

Hereinafter, the "azomethine fluorescent pigment having an emission peak in the wavelength region of 500 nm or more and 550 nm or less in the emission spectrum" is referred to as an "azomethine fluorescent pigment (Y)", and the "non-fluorescent pigment having a reflection peak in the wavelength region of 480 nm or more and 540 nm or less in the reflection spectrum" is referred to as a "pigment (G)".

In the green toner particles in the present exemplary embodiment, the mass proportion of the azomethine fluorescent pigment (Y) in the green toner particles is 3% by mass or more and 10% by mass or less and the mass ratio M1/M2 of the content M1 of the azomethine fluorescent pigment (Y) to the content M2 of the pigment (G) is 1 or more and 5 or less.

When the mass proportion of the azomethine fluorescent pigment (Y) is less than 3% by mass or more than 10% by mass, the image is less likely to exhibit a desired green color. From the viewpoint that the image exhibits a desired green color, the mass proportion of the azomethine fluorescent pigment (Y) is 3% by mass or more and 10% by mass or less, preferably 4% by mass or more and 9% by mass or less, more preferably 5% by mass or more and 8% by mass or less.

When the ratio M1/M2 is less than 1, the tint of the image is shifted to bluish tint. When the ratio M1/M2 is more than 5, the tint of the image is shifted to yellowish tint. From the viewpoint that the image exhibits a desired green color, the ratio M1/M2 is 1 or more and 5 or less, preferably 1.5 or more and 4.5 or less, more preferably 2 or more and 4 or less.

In the green toner particles in the present exemplary embodiment, the total content of the azomethine fluorescent pigment (Y) and the pigment (G) is preferably 5% by mass or more and 15% by mass or less with respect to the total amount of green toner particles.

When the total content of the two pigments is 5% by mass or more, the chroma of a green image is high. From the viewpoint of enhancing the chroma of the green image, the total content of the two pigments is preferably 5% by mass or more, more preferably 7% by mass or more, still more preferably 9% by mass or more.

When the total content of the two pigments is 15% by mass or less, the brightness of a green image is high. From the viewpoint of enhancing the brightness of the green image, the total content of the two pigments is preferably 15% by mass or less, more preferably 14% by mass or less, still more preferably 12% by mass or less.

The difference in wavelength between the emission peak of the azomethine fluorescent pigment (Y) having the maximum content among azomethine fluorescent pigments (Y) contained in the green toner particles in the present exemplary embodiment and the reflection peak of the pigment (G) having the maximum content among pigments (G) contained in the green toner particles is preferably 40 nm or less from the viewpoint of enhancing the brightness and chroma of the green image. The difference in wavelength between the emission peak and the reflection peak is preferably as small as possible, more preferably 30 nm or less, still more preferably 20 nm or less, still more preferably 10 nm or less, still more preferably 5 nm or less, ideally 0 nm.

In all the combinations of the emission peak of the azomethine fluorescent pigment (Y) and the reflection peak of the pigment (G) contained in the green toner particles in the present exemplary embodiment, the difference in wavelength between the emission peak and the reflection peak is preferably 40 nm or less from the viewpoint of enhancing the brightness and chroma of the green image. The difference in wavelength between the emission peak and the reflection peak is preferably as small as possible, more preferably 30 nm or less, still more preferably 20 nm or less, still more preferably 10 nm or less, still more preferably 5 nm or less, ideally 0 nm.

The color difference ΔE between the color when a solid image (an image having a density of 100%) is formed on coated paper using the green toner according to the present exemplary embodiment and a color sample TOKA FLASH VIVA DX 650 (T&K TOKA Corporation) in the CIE1976 L*a*b* color space is preferably 13.5 or less. The color difference ΔE is preferably as small as possible, more preferably 10 or less, still more preferably 6.5 or less, still more preferably 3 or less, still more preferably 1 or less, ideally 0.

In the present exemplary embodiment, the color difference ΔE between the image formed using the green toner and a color sample TOKA FLASH VIVA DX 650 (T&K TOKA Corporation) in the CIE1976 L*a*b* color space is defined by the following equation.

$$\Delta E = \sqrt{(L_1 - L_2)^2 + (a_1 - a_2)^2 + (b_1 - b_2)^2}$$

In the equation, $L_1$, $a_1$, and $b_1$ and $L_2$, $a_2$, and $b_2$ are an L' value, an a* value, and a b value in the CIE1976 L*a*b* color space. $L_1$, $a_1$, and $b_1$ are the L* value, a* value, and b* value of the color sample TOKA FLASH VIVA DX 650, and are values obtained by subjecting the color sample TOKA FLASH VIVA DX 650 to measurement using a reflection spectrodensitometer. $L_2$, $a_2$, and $b_2$ are the L* value, a* value, and b* value of the image formed using the green toner, and are values obtained by subjecting the image to measurement using a reflection spectrodensitometer. The color sample TOKA FLASH VIVA DX 650 (T&K TOKA Corporation) is a color sample in which an image is formed on coated paper, the image formed using the green toner is also formed on coated paper, and then the color difference ΔE is measured.

In the present exemplary embodiment, the coordinate values of the green toner in the CIE1976 L*a*b* color space are measured by the following method.

A green toner as a sample is mixed with a carrier and then put into a developing device of an image forming apparatus, and a solid image (an image having a density of 100%) having an applied toner amount of 4.0 g/m$^2$ is formed on coated paper at a fixing temperature of 180° C. The coordinate values of the formed solid image in the CIE1976 L*a*b* color space are measured at 10 random positions using a reflection spectrodensitometer, and the average values of the L* value, a* value, and b* value are calculated.

The reflectance of the reflection peak in the spectral reflection spectrum of a solid image formed on coated paper using the green toner according to the present exemplary embodiment is preferably 70% or more.

The green toner according to the present exemplary embodiment contains oil-treated silica particles externally added to the green toner particles.

The green toner according to the present exemplary embodiment is relatively less likely to be triboelectrically charged because of the fact that the green toner particles contain the azomethine fluorescent pigment (Y), but the electric resistance of the carrier increases since oil is supplied from the oil-treated silica particles to the carrier, and the performance of the carrier to triboelectrically charge the toner is improved, and therefore, the green toner according to the present exemplary embodiment is sufficiently charged.

Hence, in the green toner according to the present exemplary embodiment, fogging (a phenomenon in which toner adheres to a non-image area of a recording medium) is less likely to occur than in a green toner to which oil-treated silica particles are not externally added.

Hereinafter, the configuration of the green toner according to the present exemplary embodiment will be described in detail.

[Green Toner Particles]

The green toner particles contain a binder resin, an azomethine fluorescent pigment (Y), and a pigment (G), and if necessary, a release agent and other additives.

—Azomethine Fluorescent Pigment (Y)—

The azomethine fluorescent pigment (Y) has an emission peak in a wavelength region of 500 nm or more and 550 nm or less in the emission spectrum. The emission peak of the azomethine fluorescent pigment (Y) is preferably in a wavelength region of 505 nm or more and 540 nm or less, more preferably in a wavelength region of 510 nm or more and 535 nm or less, still more preferably in a wavelength region of 515 nm or more and 530 nm or less.

The azomethine fluorescent pigment (Y) is a pigment having an azomethine structure (that is, $-R^1C{=}N-$, $R^1$ represents a hydrogen atom or a monovalent substituent) in the molecule. The azomethine fluorescent pigment (Y) is preferably bisazomethine, that is, a compound having $-R^1C{=}N-N{=}CR^2-$ ($R^1$ and $R^2$ each independently represent a hydrogen atom or a monovalent substituent) in the molecule.

Examples of the azomethine fluorescent pigment (Y) include the following azomethine compounds (1) to (3).

Azomethine compound (1)

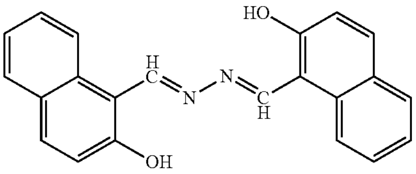

Azomethine compound (2)

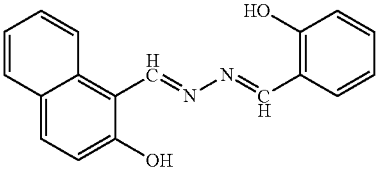

Azomethine compound (3)

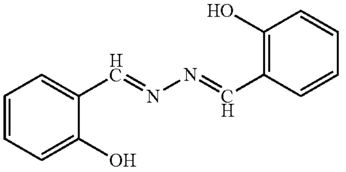

The emission peak of the azomethine compound (1) is 520 nm.

The emission peak of the azomethine compound (2) is 510 nm.

The emission peak of the azomethine compound (3) is 520 nm.

The azomethine fluorescent pigment (Y) is preferably at least one selected from the group consisting of the azomethine compound (1), the azomethine compound (2), and the azomethine compound (3).

The azomethine fluorescent pigment (Y) is preferably C.I. Pigment Yellow 101. C.I. Pigment Yellow 101 is the azomethine compound (1).

The volume average particle size D1 of the azomethine fluorescent pigment (Y) is preferably 30 nm or more and 800 nm or less, more preferably 50 nm or more and 700 nm or less, still more preferably 150 nm or more and 600 nm or less, still more preferably 250 nm or more and 400 nm or less from the viewpoint of achieving dispersibility in toner particles, colorability on recording media, fixability to recording media, and the like in a well-balanced manner.

The volume average particle size of a pigment is measured with the pigment dispersed in an aqueous solution of a surfactant using a laser diffraction particle size distribution analyzer (for example, LA-700 manufactured by HORIBA, Ltd.). The volume-based particle size distribution is plotted from the small particle size side, and the particle size at which the cumulative volume of particles is 50% is taken as the volume average particle size.

In the green toner according to the present exemplary embodiment, from the viewpoint of suppressing fixing offset (a phenomenon in which a toner image adheres to a fixing member and peels off from a recording medium, which occurs when the toner image is fixed on the recording medium), it is preferable that the volume average particle size D1 of the azomethine fluorescent pigment (Y) is 30 nm or more and 800 nm or less and the volume average particle size D1 of the azomethine fluorescent pigment (Y) and the volume average particle size D2 of the pigment (G) satisfy the relation of D1>D2.

In the description above, D1 is more preferably 50 nm or more and 700 nm or less, still more preferably 150 nm or more and 600 nm or less, still more preferably 250 nm or more and 400 nm or less.

—Pigment (G)—

The pigment (G) has a reflection peak in a wavelength region of 480 nm or more and 540 nm or less in the reflection spectrum. The reflection peak of the pigment (G) is preferably in a wavelength region of 485 nm or more and 535 nm or less, more preferably in a wavelength region of 490 nm or more and 530 nm or less, still more preferably in a wavelength region of 495 nm or more and 525 nm or less.

Examples of the pigment (G) include halogenated phthalocyanine compounds and lake pigments of triphenylmethane dyes. As the pigment (G), halogenated phthalocyanine compounds are preferable.

As the pigment (G), halogenated phthalocyanine compounds are preferable, and at least one selected from the group consisting of halogenated copper phthalocyanine and halogenated zinc phthalocyanine is preferable.

Examples of the halogenated copper phthalocyanine include C.I. Pigment Green 7 (reflection peak: 500 nm), C.I. Pigment Green 36 (reflection peak: 510 nm), and C.I. Pigment Blue 76 (reflection peak: 490 nm).

Examples of the halogenated zinc phthalocyanine include C.I. Pigment Green 58 (reflection peak: 515 nm) and C.I. Pigment Green 59 (reflection peak: 520 nm).

The pigment (G) is preferably at least one selected from the group consisting of C.I. Pigment Green 7, C.I. Pigment Green 36, C.I. Pigment Green 58, C.I. Pigment Green 59, and C.I. Pigment Blue 76.

The volume average particle size D2 of the pigment (G) is preferably 20 nm or more and 400 nm or less, more preferably 50 nm or more and 300 nm or less, still more preferably 100 nm or more and 250 nm or less, still more preferably 120 nm or more and 200 nm or less from the viewpoint of achieving dispersibility in toner particles, colorability on recording media, fixability to recording media, and the like in a well-balanced manner.

The volume average particle size of a pigment is measured with the pigment dispersed in an aqueous solution of a surfactant using a laser diffraction particle size distribution analyzer (for example, LA-700 manufactured by HORIBA, Ltd.). The volume-based particle size distribution is plotted from the small particle size side, and the particle size at which the cumulative volume of particles is 50% is taken as the volume average particle size.

The volume average particle size D1 of the azomethine fluorescent pigment (Y) and the volume average particle size D2 of the pigment (G) preferably satisfy the relation of D1>D2 from the viewpoint of achieving dispersibility in toner particles, colorability on recording media, fixability to recording media, and the like in a well-balanced manner.

The ratio D1/D2 of the volume average particle size D1 of the azomethine fluorescent pigment (Y) to the volume average particle size D2 of the pigment (G) is preferably more than 1 and 3 or less, more preferably 1.2 or more and 2.5 or less, still more preferably 1.5 or more and 2 or less from the viewpoint of enhancing the brightness and chroma of the green image.

The green toner particles may contain colorants other than the azomethine fluorescent pigment (Y) and the pigment (G).

The total amount of the azomethine fluorescent pigment (Y) and the pigment (G) in the total amount of colorants contained in the green toner particles is preferably 90% by mass or more, more preferably 95% by mass or more, still more preferably 100% by mass.

—Binder Resin—

Examples of the binder resin include vinyl resins containing homopolymers of monomers such as styrenes (for example, styrene, para-chlorostyrene, and $\alpha$-methylstyrene), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (for example, acrylonitrile and methacrylonitrile), vinyl ethers (for example, vinyl methyl ether and vinyl isobutyl ether), vinyl ketones (for example, vinyl methyl ketone, vinyl ethyl ketone, and vinyl isopropenyl ketone), and olefins (for example, ethylene, propylene, and butadiene), or copolymers obtained by combining two or more of these monomers.

Examples of the binder resin also include non-vinyl resins such as an epoxy resin, a polyester resin, a polyurethane resin, a polyamide resin, a cellulose resin, a polyether resin, and a modified rosin, mixtures of these and the vinyl resins, and graft polymers obtained by polymerizing vinyl monomers in the presence of these.

These binder resins may be used singly or in combination of two or more kinds thereof.

A polyester resin is suitable as the binder resin.

Examples of the polyester resin include known polyester resins.

Examples of the polyester resin include a condensation polymer of a polycarboxylic acid and a polyhydric alcohol. As the polyester resin, a commercially available product may be used, or a synthesized product may be used.

Examples of the polycarboxylic acid include aliphatic dicarboxylic acid (for example, oxalic acid, malonic acid, maleic acid, fumaric acid, citraconic acid, itaconic acid, glutaconic acid, succinic acid, alkenylsuccinic acid, adipic acid, and sebacic acid), alicyclic dicarboxylic acids (for example, cyclohexanedicarboxylic acid), aromatic dicarboxylic acids (for example, terephthalic acid, isophthalic acid, phthalic acid, and naphthalenedicarboxylic acid), anhydrides thereof, or lower alkyl (for example, having 1 or more and 5 or less carbon atoms) esters thereof. Among these, for example, aromatic dicarboxylic acids are preferable as the polycarboxylic acid.

As the polycarboxylic acid, a tri- or higher carboxylic acid having a crosslinked structure or a branched structure may be used together with the dicarboxylic acids. Examples of the tri- or higher carboxylic acid include trimellitic acid, pyromellitic acid, anhydrides thereof, or lower alkyl (for example, having 1 or more and 5 or less carbon atoms) esters thereof.

The polycarboxylic acids may be used singly or in combination of two or more kinds thereof.

Examples of the polyhydric alcohol include aliphatic diols (for example, ethylene glycol, diethylene glycol, triethylene glycol, propylene glycol, butanediol, hexanediol, and neopentyl glycol), alicyclic diols (for example, cyclohexanediol, cyclohexanedimethanol, and hydrogenated bisphenol A), and aromatic diols (for example, ethylene oxide adduct of bisphenol A and propylene oxide adduct of bisphenol A). Among these, as the polyhydric alcohol, for example, aromatic diols and alicyclic diols are preferable, and aromatic diols are more preferable.

As the polyhydric alcohol, a trihydric or higher polyhydric alcohol having a crosslinked structure or a branched structure may be used together with the diols. Examples of the trihydric or higher polyhydric alcohol include glycerin, trimethylolpropane, and pentaerythritol.

The polyhydric alcohols may be used singly or in combination of two or more kinds thereof.

The glass transition temperature (Tg) of the polyester resin is preferably 50° C. or more and 80° C. or less, more preferably 50° C. or more and 65° C. or less.

The glass transition temperature is determined from a DSC curve obtained by differential scanning calorimetry (DSC), and more specifically, is determined by "extrapolated glass transition starting temperature" described in the method for determining a glass transition temperature in JIS K 7121:1987 "Testing methods for transition temperatures of plastics".

The weight average molecular weight (Mw) of the polyester resin is preferably 5000 or more and 1000000 or less, more preferably 7000 or more and 500000 or less.

The number average molecular weight (Mn) of the polyester resin is preferably 2000 or more and 100000 or less.

The molecular weight distribution Mw/Mn of the polyester resin is preferably 1.5 or more and 100 or less, more preferably 2 or more and 60 or less.

The weight average molecular weight and the number average molecular weight are measured by gel permeation chromatography (GPC). The molecular weight measurement by GPC is performed with a THF solvent, using a GPC HLC-8120GPC manufactured by Tosoh Corporation as a measurement instrument and a column TSKgel SuperHM-M (15 cm) manufactured by Tosoh Corporation. The weight average molecular weight and the number average molecular weight are calculated from the measurement results using a molecular weight calibration curve created with monodisperse polystyrene standard samples.

The polyester resin is obtained by a known production method. Specifically, for example, the polyester resin is obtained by a method in which the polymerization temperature is set to 180° C. or more and 230° C. or less, the pressure in the reaction system is reduced if necessary, and the reaction is conducted while water or an alcohol generated at the time of condensation is removed.

In a case where the raw material monomers are not dissolved or compatibilized at the reaction temperature, a solvent having a high boiling point may be added as a solubilizing agent to dissolve the monomers. In this case, the polycondensation reaction is conducted while the solubilizing agent is distilled off. In a case where a monomer having poor compatibility is present, the monomer having poor compatibility and an acid or alcohol to be polycondensed with the monomer may be condensed in advance, and then the resultant product may be polycondensed with the main component.

The content of the binder resin is preferably 40% by mass or more and 95% by mass or less, more preferably 50% by mass or more and 90% by mass or less, still more preferably 60% by mass or more and 85% by mass or less with respect to the total amount of the toner particles.

—Release Agent—

Examples of the release agent include hydrocarbon-based waxes; natural waxes such as carnauba wax, rice wax, and candelilla wax; synthetic or mineral/petroleum-based waxes such as montan wax; and ester-based waxes such as fatty acid esters and montanic acid esters. The release agent is not limited thereto.

The melting temperature of the release agent is preferably 50° C. or more and 110° C. or less, more preferably 60° C. or more and 100° C. or less.

The melting temperature is determined from a DSC curve obtained by differential scanning calorimetry (DSC) according to "melting peak temperature" described in a method for determining a melting temperature in JIS K 7121:1987 "Testing methods for transition temperatures of plastics".

The content of the release agent is preferably 1% by mass or more and 20% by mass or less, more preferably 5% by mass or more and 15% by mass or less with respect to the total amount of the toner particles.

—Other Additives—

Examples of other additives include known additives such as a magnetic material, a charge control agent, and an inorganic powder. These additives are contained in the toner particles as internal additives.

—Characteristics of Toner Particles—

The toner particles may be toner particles having a single-layer structure or toner particles having a so-called core-shell structure including a core (core particle) and a covering layer (shell layer) covering the core.

The toner particles having a core-shell structure may include, for example, a core containing a binder resin and, if necessary, other additives such as a colorant and a release agent, and a covering layer containing a binder resin.

The volume average particle size (D50v) of the toner particles is preferably 2 μm or more and 10 μm or less, more preferably 4 μm or more and 8 μm or less.

Various average particle sizes and various particle size distribution indices of the toner particles are measured using a Coulter Multisizer II (manufactured by Beckman Coulter, Inc.) and ISOTON-II (manufactured by Beckman Coulter, Inc.) as an electrolytic solution.

In the measurement, 0.5 mg or more and 50 mg or less of a measurement sample is added to 2 ml of a 5% by mass aqueous solution of a surfactant (preferably sodium alkylbenzene sulfonate) as a dispersant. This is added to 100 ml or more and 150 ml or less of the electrolytic solution.

The electrolytic solution in which the sample is suspended is subjected to a dispersion treatment for 1 minute using an ultrasonic disperser, and the particle size distribution of particles having a particle size in a range of 2 μm or more and 60 μm or less is measured using Coulter Multisizer II and an aperture having an aperture diameter of 100 μm. The number of particles to be sampled is 50,000.

Cumulative distributions of volumes and numbers are plotted from the small size side with respect to the particle size ranges (channels) divided on the basis of the measured particle size distribution, and the particle sizes at which the cumulative volume and cumulative number of particles are 16% are defined as a volume particle size D16v and a number particle size D16p, respectively, the particle sizes at which the cumulative volume and cumulative number of particles are 50% are defined as a volume average particle size D50v and a cumulative number average particle size D50p, respectively, and the particle sizes at which the cumulative volume and cumulative number of particles are 84% are defined as a volume particle size D84v and a number particle size D84p, respectively.

Using these, the volume-based particle size distribution indices (GSDv) are calculated as $(D84v/D16v)^{1/2}$ and the number-based particle size distribution indices (GSDp) are calculated as $(D84p/D16p)^{1/2}$.

The average circularity of the toner particles is preferably 0.94 or more and 1.00 or less, more preferably 0.95 or more and 0.98 or less.

The average circularity of the toner particles is determined by (circle-equivalent perimeter)/(perimeter) [(perimeter of circle having same projected area as particle image)/(perimeter of particle projected image)]. Specifically, the average circularity is a value measured by the following method.

First, the average circularity is determined by a flow-type particle image analyzer (FPIA-3000 manufactured by Sysmex Corporation) that suctions and collects toner particles to be measured, forms a flat flow, captures a particle image as a still image by instantaneously emitting strobe light, and performs image analysis of the particle image. The number of samples for determining the average circularity is 3500.

In a case where the toner contains an external additive, the toner (developer) to be measured is dispersed in water containing a surfactant and then subjected to ultrasonic treatment to obtain toner particles from which the external additive has been removed.

[Oil-Treated Silica Particles]

The green toner according to the present exemplary embodiment contains oil-treated silica particles as an external additive.

Examples of the silica particles in the oil-treated silica particles include dry silica particles and wet silica particles.

Examples of the dry silica particles include pyrogenic silica (fumed silica) obtained by burning a silane compound, and deflagration silica obtained by explosively burning metal silicon powder.

Examples of the wet silica particles include wet silica particles obtained by a neutralization reaction between sodium silicate and a mineral acid (precipitated silica synthesized and aggregated under alkaline conditions and gel silica particles synthesized and aggregated under acidic conditions), colloidal silica particles (silica sol particles) obtained by alkalifying and polymerizing acidic silicic acid, and sol-gel silica particles obtained by hydrolysis of an organic silane compound (for example, alkoxysilane).

Examples of the oil in the oil-treated silica particles include silicone oil, paraffin oil, fluorine oil, mineral oil, and vegetable oil. The oils may be used singly or in combination of two or more kinds thereof.

The treatment of silica particles with oil is performed, for example, by a method in which the silica particles are dispersed in a mixed liquid of an alcohol and oil, and then the alcohol is distilled off using an evaporator for drying.

The oil-treated silica particles are preferably silicone oil-treated silica particles. The silicone oil in the silicone oil-treated silica particles is preferably dimethyl silicone oil.

The average primary particle size of the oil-treated silica particles is preferably 15 nm or more and 200 nm or less, more preferably 40 nm or more and 150 nm or less, still more preferably 80 nm or more and 120 nm or less from the viewpoint of supplying an appropriate amount of oil to the carrier.

The average primary particle size of the oil-treated silica particles is determined as follows.

An image of the green toner is captured at a magnification of 40,000-fold using a scanning electron microscope (SEM) (S-4800, manufactured by Hitachi High-Tech Corporation) equipped with an energy dispersive X-ray spectrometer (EDX apparatus) (EMAX Evolution X-Max 80 $mm^2$, manufactured by HORIBA, Ltd.). From one visual field, 500 primary particles of the oil-treated silica particles are identified based on the presence of silicon atoms, oxygen atoms, and carbon atoms by EDX analysis. The images of 500 oil-treated silica particles are analyzed with image processing analysis software WinRoof (Mitani Corporation) to determine the equivalent circle diameter of each primary particle. In the number-based distribution of the equivalent circle diameter, the equivalent circle diameter at which the cumulative number of particles is 50% from the small size side is taken as the average primary particle size.

The oil-treated silica particles are preferably oil-treated silica particles having a free oil amount of 5% by mass or more and 30% by mass or less.

When the free oil amount in the oil-treated silica particles is 5% by mass or more, an appropriate amount of oil can be supplied to the carrier. From this point of view, the free oil amount in the oil-treated silica particles is more preferably 8% by mass or more, still more preferably 10% by mass or more.

When the free oil amount in the oil-treated silica particles is 30% by mass or less, the inside of an image forming apparatus is less likely to be contaminated with oil. From this point of view, the free oil amount in the oil-treated silica particles is more preferably 28% by mass or less, still more preferably 25% by mass or less.

The method for determining the free oil amount in the oil-treated silica particles is as follows.

Proton NMR measurement is performed using the oil-treated silica particles as a sample under the following conditions. A calibration curve is created using tetramethylsilane as a reference substance. The free oil amount is calculated from the detected peak intensity. The mass proportion (% by mass) of the free oil in the total mass of the oil-treated silica particles is calculated.

Nuclear magnetic resonance instrument: AL 400 manufactured by JEOL Ltd., magnetic field: 9.4 T, H nucleus: 400 MHz Sample tube: Zirconia sample tube, diameter: 5 mm Solvent: Deuterated chloroform Reference substances: Tetramethylsilane Measurement frequency: Δ87 kHz/400 MHz (=Δ20 ppm)

Measurement temperature: 25° C.

Number of integrations: 16 times

Resolution: 0.24 Hz (32000 point)

The free oil amount in the oil-treated silica particles can be controlled by increasing or decreasing the amount of oil used in the treatment of silica particles with oil.

In the green toner according to the present exemplary embodiment, when the green toner is dispersed in water containing a surfactant and subjected to ultrasonic treatment at a power of 20 W and a frequency of 20 kHz for 1 minute, the oil-treated silica particles detached from the green toner particles are preferably 20% by mass or more and 40% by mass or less of the oil-treated silica particles externally added to the green toner particles.

The mass proportion of the oil-treated silica particles detached from the green toner particles by the ultrasonic treatment is also referred to as a proportion of oil-treated silica particles weakly attached.

When the proportion of oil-treated silica particles weakly attached is 20% by mass or more, an appropriate amount of oil can be supplied to the carrier. From this point of view, the proportion of oil-treated silica particles weakly attached is more preferably 25% by mass or more, still more preferably 28% by mass or more.

When the proportion of oil-treated silica particles weakly attached is 40% by mass or less, the inside of an image forming apparatus is less likely to be contaminated with oil. From this point of view, the proportion of oil-treated silica particles weakly attached is more preferably 38% by mass or less, still more preferably 35% by mass or less.

The proportion of oil-treated silica particles weakly attached is determined as follows.

An aqueous surfactant solution containing a surfactant (NOIGEN ET-165, DKS Co. Ltd.) in ion-exchanged water at 0.5% by mass is prepared. The aqueous surfactant solution is put into a 100 mL glass beaker by 50 mL, the green toner is added thereto by 4 g, and the mixture is stirred using a magnetic stirrer at a rotation speed of 100 rpm for 5 minutes to prepare a toner dispersion. This toner dispersion is prepared two.

The probe of an ultrasonic homogenizer (VCX750, Sonics and Materials, Inc.) is inserted into one toner dispersion (inserted until the distance between the tip of the probe and the bottom of the beaker becomes 1.0 cm), and an ultrasonic wave having a power of 20 W and a frequency of 20 kHz is applied for 1 minute. The toner dispersion is centrifuged to be fractionated into the green toner particles, the oil-treated silica particles, and the other external additives depending on the density, and the fraction containing the oil-treated silica particles is collected. This fraction is dried, and the mass of the oil-treated silica particles is measured. This mass (that is, the mass of the oil-treated silica particles weakly attached to the green toner particles) is denoted as S1.

The probe of an ultrasonic homogenizer (VCX750, Sonics and Materials, Inc.) is inserted into the other toner dispersion (inserted until the distance between the tip of the probe and the bottom of the beaker becomes 1.0 cm), and an ultrasonic wave having a power of 100 W and a frequency of 10 kHz is applied for 30 minutes. This ultrasonic wave intensity is an intensity capable of detaching all of the oil-treated silica particles from the green toner particles. The toner dispersion is centrifuged to be fractionated into the green toner particles, the oil-treated silica particles, and the other external additives depending on the density, and the fraction containing the oil-treated silica particles is collected. This fraction is dried, and the mass of the oil-treated silica particles is measured. This mass (that is, the total mass of the oil-treated silica particles externally added to the green toner) is denoted as S2.

The value of $S1/S2 \times 100$ is taken as the proportion of oil-treated silica particles weakly attached (% by mass).

The proportion of oil-treated silica particles weakly attached can be controlled by adjusting the rotation speed and/or rotation time of the blender or mixer when the green toner particles and the oil-treated silica particles are mixed.

The amount of the oil-treated silica particles externally added is preferably 0.5 parts by mass or more and 5 parts by mass or less, more preferably 0.8 parts by mass or more and 4 parts by mass or less, still more preferably 1 part by mass or more and 3 parts by mass or less with respect to 100 parts by mass of the green toner particles from the viewpoint of supplying an appropriate amount of oil to the carrier.

The content of the oil-treated silica particles is preferably 50% by mass or more and 100% by mass or less with respect to the total amount of the external additives contained in the green toner.

[Other External Additives]

The green toner according to the present exemplary embodiment may contain external additives other than the oil-treated silica particles. Examples of the external additives other than the oil-treated silica particles include inorganic particles such as $SrTiO_3$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)_n$, $Al_2O_3{\cdot}2SiO_2$, $CaCO_3$, $MgCO_3$, $BaSO_4$, and $MgSO_4$.

The surfaces of the inorganic particles are preferably subjected to hydrophobization treatment. The hydrophobization treatment is performed, for example, by immersing the inorganic particles in a hydrophobizing agent. The hydrophobizing agent is not particularly limited, and examples thereof include a silane-based coupling agent, silicone oil, a titanate-based coupling agent, and an aluminum-based coupling agent. These may be used singly or in combination of two or more kinds thereof.

Examples of the external additives also include resin particles (resin particles of polystyrene, polymethyl methacrylate, and melamine resin) and cleaning activators (for example, metal salts of higher fatty acids represented by zinc stearate, and particles of fluorine-based high molecular weight compounds).

In a case where the green toner according to the present exemplary embodiment contains external additives other than the oil-treated silica particles, the amount of the other external additives externally added is preferably 0.01 parts by mass or more and 5 parts by mass or less, more preferably 0.01 parts by mass or more and 2 parts by mass or less with respect to 100 parts by mass of the toner particles.

[Method for Producing Green Toner]

The green toner according to the present exemplary embodiment is obtained by producing green toner particles and then externally adding external additives to the green toner particles. The external additives include at least oil-treated silica particles.

The green toner particles may be produced by any one of a dry production process (for example, a kneading-pulverizing process) or a wet production process (for example, an aggregation-coalescence process, a suspension polymerization process, and a dissolution suspension process). These production processes are not particularly limited, and known production processes are adopted. Among these, the toner particles may be obtained by the aggregation-coalescence process.

In a case where the green toner particles are produced by an aggregation-coalescence process, the following production method is preferable.

The production method includes a step of preparing a resin particle dispersion in which resin particles serving as a binder resin are dispersed (resin particle dispersion preparing step);

- a step of preparing a fluorescent pigment (Y) dispersion in which an azomethine fluorescent pigment (Y) is dispersed (fluorescent pigment (Y) dispersion preparing step);
- a step of preparing a pigment (G) dispersion in which a pigment (G) is dispersed (pigment (G) dispersion preparing step);
- a step of forming aggregated particles by aggregating mixed particles in a mixed dispersion in which the resin particle dispersion, the fluorescent pigment (Y) dispersion, and the pigment (G) dispersion are mixed (aggregated particle forming step); and
- a step of forming green toner particles by heating the aggregated particle dispersion in which aggregated particles are dispersed and thus fusing and coalescing the aggregated particles (fusing and coalescing step).

Hereinafter, details of each step will be described. In the following description, the green toner particles are simply referred to as toner particles. In the following description, a method for obtaining toner particles containing a release agent is described, but the release agent is used if necessary.

—Resin Particle Dispersion Preparing Step—

The resin particle dispersion is prepared, for example, by dispersing resin particles in a dispersion medium with a surfactant.

Examples of the dispersion medium that is used in the resin particle dispersion include aqueous media.

Examples of the aqueous media include water such as distilled water and ion-exchanged water and alcohols. These may be used singly or in combination of two or more kinds thereof.

Examples of the surfactant include anionic surfactants such as sulfates, sulfonates, phosphates, and soaps; cationic surfactants such as amine salts and quaternary ammonium salts; and nonionic surfactants such as polyethylene glycol, alkylphenol-ethylene oxide adducts, and polyhydric alcohols. Among these, anionic surfactants and cationic surfactants are particularly exemplified. A nonionic surfactant may be used in combination with an anionic surfactant or a cationic surfactant.

The surfactants may be used singly or in combination of two or more kinds thereof.

In the resin particle dispersion, examples of a method for dispersing resin particles in a dispersion medium include general dispersion methods using a rotary shear-type homogenizer, a ball mill, a sand mill, or a dyno mill having media, and the like. Depending on the kind of resin particles, the resin particles may be dispersed in a dispersion medium by a phase inversion emulsification method. The phase inversion emulsification method is a method in which a resin to be dispersed is dissolved in a hydrophobic organic solvent in which the resin is soluble, a base is added to the organic continuous phase (O phase) for neutralization, and then an aqueous medium (W phase) is added to perform phase inversion from W/O to O/W, thereby dispersing the resin in the aqueous medium in the form of particles.

The volume average particle size of the resin particles dispersed in the resin particle dispersion is, for example, preferably 0.01 μm or more and 1 μm or less, more preferably 0.08 μm or more and 0.8 μm or less, still more preferably 0.1 μm or more and 0.6 μm or less. The volume average particle size of the resin particles is measured as follows: using the particle size distribution obtained through measurement by a laser diffraction particle size distribution analyzer (for example, LA-700 manufactured by HORIBA, Ltd.), the cumulative distribution of volume is plotted from the small particle size side with respect to the divided particle size ranges (channels), and the particle size at which the cumulative volume of particles is 50% with respect to all the particles is taken as the volume average particle size D50v. The volume average particle size of particles in other dispersions is also measured in the same manner.

The content of the resin particles contained in the resin particle dispersion is preferably 5% by mass or more and 50% by mass or less, more preferably 10% by mass or more and 40% by mass or less.

The method for preparing the release agent particle dispersion is the same as that for the resin particle dispersion. The content of the release agent particles contained in the release agent particle dispersion is preferably 5% by mass or more and 50% by mass or less, more preferably 10% by mass or more and 40% by mass or less.

—Fluorescent Pigment (Y) Dispersion Preparing Step—

The fluorescent pigment (Y) dispersion is prepared, for example, by dispersing the azomethine fluorescent pigment (Y) in a dispersion medium with a surfactant.

Examples of the dispersion medium that is used in the fluorescent pigment (Y) dispersion include aqueous media.

Examples of the aqueous media include water such as distilled water and ion-exchanged water and alcohols. These may be used singly or in combination of two or more kinds thereof.

Examples of the surfactant include anionic surfactants such as sulfates, sulfonates, phosphates, and soaps; cationic surfactants such as amine salts and quaternary ammonium salts; and nonionic surfactants such as polyethylene glycol, alkylphenol-ethylene oxide adducts, and polyhydric alcohols. Among these, anionic surfactants and cationic surfactants are particularly exemplified. A nonionic surfactant may be used in combination with an anionic surfactant or a cationic surfactant.

The surfactants may be used singly or in combination of two or more kinds thereof.

Examples of the method for dispersing the azomethine fluorescent pigment (Y) in the dispersion medium include dispersion methods using a rotary shear-type homogenizer, a ball mill, a sand mill, a dyno mill, and a key mill having media, and the like.

The volume average particle size of the azomethine fluorescent pigment (Y) dispersed in the fluorescent pigment (Y) dispersion is, for example, preferably 30 nm or more and 800 nm or less, more preferably 50 nm or more and 700 nm or less, still more preferably 150 nm or more and 600 nm or less, still more preferably 250 nm or more and 400 nm or less. The particle size of the azomethine fluorescent pigment (Y) can be adjusted, for example, by the method and time of dispersion treatment.

The content of the azomethine fluorescent pigment (Y) contained in the fluorescent pigment (Y) dispersion is preferably 5% by mass or more and 50% by mass or less, more preferably 10% by mass or more and 40% by mass or less.

—Pigment (G) Dispersion Preparing Step—

The pigment (G) dispersion is prepared, for example, by dispersing the pigment (G) in a dispersion medium with a surfactant.

Examples of the dispersion medium that is used in the pigment (G) dispersion include aqueous media.

Examples of the aqueous media include water such as distilled water and ion-exchanged water and alcohols. These may be used singly or in combination of two or more kinds thereof.

Examples of the surfactant include anionic surfactants such as sulfates, sulfonates, phosphates, and soaps; cationic surfactants such as amine salts and quaternary ammonium salts; and nonionic surfactants such as polyethylene glycol, alkylphenol-ethylene oxide adducts, and polyhydric alcohols. Among these, anionic surfactants and cationic surfactants are particularly exemplified. A nonionic surfactant may be used in combination with an anionic surfactant or a cationic surfactant.

The surfactants may be used singly or in combination of two or more kinds thereof.

Examples of the method for dispersing the pigment (G) in the dispersion medium include dispersion methods using a rotary shear-type homogenizer, a ball mill, a sand mill, a dyno mill, and a key mill having media, and the like.

The volume average particle size of the pigment (G) dispersed in the pigment (G) dispersion is, for example, preferably 20 nm or more and 400 nm or less, more preferably 50 nm or more and 300 nm or less, still more preferably 100 nm or more and 250 nm or less, still more preferably 120 nm or more and 200 nm or less. The particle size of the pigment (G) can be adjusted by, for example, the method and time of dispersion treatment.

The content of the pigment (G) contained in the pigment (G) dispersion is preferably 5% by mass or more and 50% by mass or less, more preferably 10% by mass or more and 40% by mass or less.

—Aggregated Particle Forming Step—

The resin particle dispersion, the fluorescent pigment (Y) dispersion, the pigment (G) dispersion, and the release agent particle dispersion are mixed together. Then, the resin particles, the azomethine fluorescent pigment (Y), the pigment (G), and the release agent particles are heteroaggregated in the mixed dispersion to form aggregated particles, which have a size close to the target toner particle size and contain the resin particles, the azomethine fluorescent pigment (Y), the pigment (G), and the release agent particles.

Specifically, for example, an aggregating agent is added to the mixed dispersion as well as the pH of the mixed dispersion is adjusted to be acidic (for example, a pH of 2 or more and 5 or less), a dispersion stabilizer is added if necessary, and then heating is performed to a temperature close to the glass transition temperature of the resin particles (specifically, for example, a temperature that is equal to or higher than (the glass transition temperature of the resin particles−30° C.) and equal to or lower than (the glass transition temperature−10° C.)) to aggregate the particles dispersed in the mixed dispersion, thereby forming aggregated particles.

In the aggregated particle forming step, for example, heating may be performed after an aggregating agent is added at room temperature (for example, 25° C.) while the mixed dispersion is stirred using a rotary shear-type homogenizer, the pH of the mixed dispersion is adjusted to be acidic (for example, a pH of 2 or more and 5 or less), and a dispersion stabilizer is added if necessary.

Examples of the aggregating agent include a surfactant having a polarity opposite to that of the surfactant contained in the mixed dispersion, an inorganic metal salt, and a divalent or higher valent metal complex. In a case where a metal complex is used as the aggregating agent, the amount of the surfactant used decreases, and the charging characteristics are improved.

Together with the aggregating agent, an additive, which forms a complex or a similar bond with a metal ion of the aggregating agent, may be used if necessary. A chelating agent is suitably used as this additive.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may be used. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent added is preferably 0.01 parts by mass or more and 5.0 parts by mass or less, more preferably 0.1 parts by mass or more and less than 3.0 parts by mass with respect to 100 parts by mass of the resin particles.

—Fusing and Coalescing Step—

Next, the aggregated particle dispersion in which aggregated particles are dispersed is heated, for example, to a temperature higher than or equal to the glass transition temperature of the resin particles (for example, a temperature higher than the glass transition temperature of the resin particles by 10° C. to 30° C.) to fuse and coalesce the aggregated particles, thereby forming toner particles.

Through the above-described steps, toner particles are obtained.

After an aggregated particle dispersion in which aggregated particles are dispersed is obtained, the toner particles may be produced through a step of forming second aggregated particles by further mixing the aggregated particle dispersion with a resin particle dispersion in which resin particles are dispersed and aggregating the particles so that the resin particles are further attached to the surfaces of the aggregated particles and a step of forming toner particles having a core-shell structure by heating the second aggregated particle dispersion in which the second aggregated particles are dispersed and thus fusing and coalescing the second aggregated particles.

After the fusing and coalescing step is terminated, the toner particles in the dispersion are subjected to known washing, solid-liquid separation, and drying steps to obtain dry toner particles. In the washing step, it is preferable that displacement washing with ion-exchanged water is sufficiently performed from the viewpoint of chargeability. In the solid-liquid separation step, suction filtration, pressure filtration, or the like may be performed from the viewpoint of productivity. In the drying step, freeze drying, flash drying, fluidized drying, vibration-type fluidized drying, or the like may be performed from the viewpoint of productivity.

The toner according to the present exemplary embodiment is produced by, for example, adding an external additive to the obtained dry toner particles and performing mixing. The mixing may be performed using, for example, a V blender, a Henschel mixer, or a Lödige mixer. Furthermore, coarse particles of the toner may be removed by using a vibration sieving machine, a wind force sieving machine, or the like, if necessary.

When the toner particles and the oil-treated silica particles are mixed, the rotation speed and/or the rotation time of the blender or mixer are adjusted to control the proportion of oil-treated silica particles weakly attached.

<Electrostatic Charge Image Developer>

The electrostatic charge image developer according to the present exemplary embodiment contains at least the green toner according to the present exemplary embodiment.

The electrostatic charge image developer according to the present exemplary embodiment may be a one component developer containing only the green toner according to the present exemplary embodiment, or a two component developer in which the green toner and a carrier are mixed.

The carrier is not particularly limited, and examples thereof include known carriers. Examples of the carrier include a covered carrier in which the surface of a core material formed of a magnetic powder is covered with a resin; a magnetic powder-dispersed carrier in which a magnetic powder is dispersed and blended in a matrix resin; and a resin-impregnated carrier in which a porous magnetic powder is impregnated with a resin.

The magnetic powder-dispersed carrier and the resin-impregnated carrier may be carriers in which constitutional particles of the carriers are core materials and the surfaces are covered with resins.

Examples of the magnetic powder include magnetic metals such as iron, nickel, and cobalt; and magnetic oxides such as ferrite and magnetite.

Examples of the covering resin and the matrix resin include polyethylene, polypropylene, polystyrene, polyvinyl acetate, polyvinyl alcohol, polyvinyl butyral, polyvinyl chloride, polyvinyl ether, polyvinyl ketone, vinyl chloride-vinyl acetate copolymer, styrene-acrylic acid ester copolymer, a straight silicone resin containing an organosiloxane bond or modified products thereof, a fluororesin, polyester, polycarbonate, a phenol resin, an epoxy resin, and an acrylic resin.

As the covering resin, an acrylic resin is preferable, and an acrylic resin having an alicyclic structure is more preferable from the viewpoint of the chargeability of the carrier.

The mass proportion of the acrylic resin in the total amount of resins constituting the covering resin is preferably 50% by mass or more, more preferably 80% by mass or more.

The mass proportion of the acrylic resin having an alicyclic structure in the total amount of resins constituting the covering resin is preferably 50% by mass or more, more preferably 80% by mass or more.

The acrylic resin having an alicyclic structure preferably contains cyclohexyl (meth)acrylate as a polymerization component. The mass proportion of cyclohexyl (meth)acrylate in the total amount of the polymerization components is preferably 75% by mass or more and 100% by mass or less, more preferably 85% by mass or more and 100% by mass or less, still more preferably 95% by mass or more and 100% by mass or less.

As a polymerization component other than cyclohexyl (meth)acrylate constituting the acrylic resin having an alicyclic structure, a lower alkyl ester of (meth)acrylic acid (for example, a (meth)acrylic acid alkyl ester in which the alkyl group has 1 or more and 9 or less carbon atoms) is preferable. Examples of the lower alkyl ester of (meth) acrylic acid include methyl (meth)acrylate, ethyl (meth) acrylate, propyl (meth)acrylate, butyl (meth)acrylate, hexyl (meth)acrylate, and 2-ethylhexyl (meth)acrylate. These monomers may be used singly or in combination of two or more kinds thereof.

The covering resin preferably further contains a nitrogen-containing (meth)acrylate resin. The nitrogen-containing (meth)acrylate resin preferably has an amino group.

Examples of the nitrogen-containing (meth)acrylate resin include homopolymers or copolymers of nitrogen-containing (meth)acrylates such as dimethylaminomethyl (meth) acrylate, dimethylaminoethyl (meth)acrylate, and dibutylaminomethyl (meth)acrylate; copolymers of nitrogen-containing (meth)acrylates and nitrogen-free monomers; and copolymers of nitrogen-free (meth)acrylates such as cycloalkyl (meth)acrylates and alkyl (meth)acrylates and nitrogen-containing monomers.

The covering resin and the matrix resin may contain other additives such as conductive particles. Examples of the conductive particles include particles of metals such as gold, silver, and copper, carbon black, titanium oxide, zinc oxide, tin oxide, barium sulfate, aluminum borate, and potassium titanate. Examples of other additives include silica particles. The surfaces of these particles may be subjected to hydrophobization treatment.

The average particle size of these particles is preferably 5 nm or more and 90 nm or less, more preferably 5 nm or more and 70 nm or less, still more preferably 8 nm or more and 50 nm or less.

In order to cover the surface of the core material with a resin, a method in which a covering layer forming solution in which a covering resin and various additives (used if necessary) are dissolved in an appropriate solvent is covered, and the like are exemplified. The solvent is not particularly limited, and may be selected in consideration of the kind of resin to be used, coating suitability, and the like.

Specific examples of the resin covering method include an immersion method in which the core material is immersed in the covering layer forming solution; a spray method in which the covering layer forming solution is sprayed on the surface of the core material; a fluidized bed method in which the covering layer forming solution is sprayed in a state where the core material is floated by fluidized air; and a kneader coater method in which the core material of the carrier and the covering layer forming solution are mixed in a kneader coater and then the solvent is removed.

The mixing ratio (mass ratio) of the green toner to the carrier in the two component developer is preferably green toner:carrier=1:100 to 30:100, more preferably 3:100 to 20:100.

<Image Forming Apparatus and Image Forming Method>

The image forming apparatus and image forming method according to the present exemplary embodiment will be described.

The image forming apparatus according to the present exemplary embodiment includes an image holding member, charging means that charges the surface of the image holding member, electrostatic charge image forming means that forms an electrostatic charge image on the surface of the charged image holding member, developing means that accommodates an electrostatic charge image developer and develops the electrostatic charge image formed on the surface of the image holding member into a toner image with the electrostatic charge image developer, transfer means that transfers the toner image formed on the surface of the image holding member onto the surface of a recording medium, and fixing means that fixes the toner image transferred on the surface of the recording medium. The electrostatic charge image developer according to the present exemplary embodiment is applied as the electrostatic charge image developer.

In the image forming apparatus according to the present exemplary embodiment, an image forming method (the image forming method according to the present exemplary embodiment) including a charging step of charging the surface of an image holding member; an electrostatic charge image forming step of forming an electrostatic charge image on the charged surface of the image holding member; a developing step of developing the electrostatic charge image formed on the surface of the image holding member into a toner image with the electrostatic charge image developer according to the present exemplary embodiment; a transfer step of transferring the toner image formed on the surface of the image holding member onto the surface of a recording medium; and a fixing step of fixing the toner image transferred on the surface of the recording medium is implemented.

As the image forming apparatus according to the present exemplary embodiment, known image forming apparatuses, such as a direct transfer type apparatus which directly transfers a toner image formed on the surface of an image holding member to a recording medium; an intermediate transfer type apparatus which primarily transfers a toner image formed on the surface of an image holding member to the surface of an intermediate transfer member and secondarily transfers the toner image transferred on the surface of the intermediate transfer member onto the surface of a recording medium; an apparatus including cleaning means that cleans the surface of the image holding member after transfer of the toner image and before charging; and an apparatus including discharging means that irradiates the surface of the image holding member with discharging light for discharging after transfer of the toner image and before charging, are applied.

In a case where the image forming apparatus according to the present exemplary embodiment is an intermediate transfer type apparatus, as the transfer means, for example, a configuration including an intermediate transfer member in which a toner image is transferred onto the surface, primary transfer means that primarily transfers the toner image formed on the surface of an image holding member onto the surface of an intermediate transfer member, and secondary transfer means that secondarily transfers the toner image transferred on the surface of the intermediate transfer member onto the surface of a recording medium is applied.

In the image forming apparatus according to the present exemplary embodiment, for example, a portion including the developing means may have a cartridge structure (process cartridge) that is detachably attached to the image forming apparatus. As the process cartridge, for example, a process cartridge that accommodates the electrostatic charge image developer according to the present exemplary embodiment and includes developing means is suitably used.

Hereinafter, an example of the image forming apparatus according to the present exemplary embodiment will be described, but the image forming apparatus is not limited thereto. In the following description, main parts illustrated in the drawings will be described, and description of the other parts will be omitted.

In the following description, as an example of the image forming apparatus according to the present exemplary embodiment, a six unit tandem-type image forming apparatus in which six image forming units are arranged will be described. The tandem-type image forming apparatus is not limited thereto, and may be a five unit tandem-type image forming apparatus in which five image forming units are arranged, a four unit tandem-type image forming apparatus in which four image forming units are arranged, or the like.

FIG. 1 is a schematic configuration diagram illustrating the image forming apparatus according to the present exemplary embodiment, and is a diagram illustrating an image forming apparatus of a six unit tandem type and an intermediate transfer type.

The image forming apparatus illustrated in FIG. 1 includes first to sixth image forming units 10P, 10Y, 10M, 10C, 10K, and 10G, which are electrophotographic image forming means that output images of respective colors of pink (P), yellow (Y), magenta (M), cyan (C), black (K), and green (G) based on the color-separated image data. These image forming units (hereinafter may be simply referred to as "units") 10P, 10Y, 10M, 10C, 10K, and 10G are horizontally disposed side by side at predetermined intervals. These units 10P, 10Y, 10M, 10C, 10K, and 10G may be process cartridges detachably attached to the image forming apparatus.

Below the units 10P, 10Y, 10M, 10C, 10K, and 10G, an intermediate transfer belt (an example of the intermediate transfer member) 20 extends through each of the units. The intermediate transfer belt 20 is wound around a driving roller 22, a supporting roller 23, and a counter roller 24, which are in contact with the inner surface of the intermediate transfer belt 20, so as to run in the direction from the first unit 10P toward the sixth unit 10G. An intermediate transfer member cleaning device 21 is provided on the image holding surface side of the intermediate transfer belt 20 so as to face the driving roller 22.

The toners of pink, yellow, magenta, cyan, black, and green accommodated in the toner cartridges 8P, 8Y, 8M, 8C, 8K, and 8G are respectively supplied to the developing devices (an example of the developing means) 4P, 4Y, 4M, 4C, 4K, and 4G of the units 10P, 10Y, 10M, 10C, 10K, and 10G.

Since the first to sixth units 10P, 10Y, 10M, 10C, 10K, and 10G have the same configuration and operation, the sixth unit 10G that forms a green image will be described here as a representative.

The sixth unit 10G includes a photoreceptor 1G acting as an image holding member. Around the photoreceptor 1G, a charging roller (an example of the charging means) 2G that charges the surface of the photoreceptor 1G to a predetermined potential, an exposure device (an example of the electrostatic charge image forming means) 3G that forms an electrostatic charge image by exposing the charged surface to a laser beam based on a color-separated image signal, a developing device (an example of the developing means) 4G that develops the electrostatic charge image by supplying a toner to the electrostatic charge image, a primary transfer roller (an example of the primary transfer means) 5G that transfers the developed toner image onto the intermediate transfer belt 20, and a photoreceptor cleaning device (an example of the cleaning means) 6G that removes toner remaining on the surface of photoreceptor 1G after the primary transfer are disposed in this order.

The first transfer roller 5G is disposed inside the intermediate transfer belt 20 and is provided at a position facing the photoreceptor 1G. A bias power source (not illustrated) that applies a primary transfer bias is connected to each of the primary transfer rollers 5Y, 5P, 5M, 5C, 5G, and 5K of the respective units. Each bias power source changes the value of the transfer bias applied to each primary transfer roller through control by a control section (not illustrated).

Hereinafter, an operation of forming a green image in the sixth unit 10G will be described.

First, prior to the operation, the surface of the photoreceptor 1G is charged to a potential of −600 V to −800 V by the charging roller 2G.

The photoreceptor 1G is formed by stacking a photosensitive layer on an electrically conductive (for example, a volume resistivity of $1\times10^{-6}$ Ωcm or less at 20° C.) substrate. The photosensitive layer usually has a high resistance (resistance of a general resin), but has a property that the specific resistance of a portion irradiated with a laser beam changes when the portion is irradiated with the laser beam. Then, the charged surface of the photoreceptor 1G is irradiated with a laser beam from the exposure device 3G in accordance with the green image date sent from the control section (not illustrated). Thus, an electrostatic charge image of a green image pattern is formed on the surface of the photoreceptor 1G.

The electrostatic charge image is an image formed on the surface of the photoreceptor 1G by charging, and is a so-called negative latent image formed by the fact that the specific resistance of the irradiated portion of the photosensitive layer is decreased by the laser beam from the exposure device 3G, the charges on the surface of the photoreceptor 1G flow, and the charges at the portions not irradiated with the laser beam remain.

The electrostatic charge image formed on the photoreceptor 1G rotates to a predetermined developing position as the photoreceptor 1G runs. Then, at the developing position, the electrostatic charge image on the photoreceptor 1G is developed into a toner image by the developing device 4G to be visualized.

In the developing device 4G, for example, an electrostatic charge image developer containing at least a green toner and a carrier is accommodated. The green toner is triboelectrically charged by being stirred inside the developing device 4G, has a charge of the same polarity (negative polarity) as the charge on the photoreceptor 1G, and is held on a developer roller (an example of the developer holding member). Next, as the surface of the photoreceptor 1G passes through the developing device 4G, the green toner electrostatically adheres to the charge-erased latent image portion on the surface of the photoreceptor 1G, and the latent image is developed with the green toner. The photoreceptor 1G on which the green toner image has been formed is continuously run at a predetermined speed, and the toner image developed on the photoreceptor 1G is conveyed to a predetermined primary transfer position.

When the green toner image on the photoreceptor 1G is conveyed to the primary transfer position, a primary transfer bias is applied to the primary transfer roller 5G, the electrostatic force directed from the photoreceptor 1G to the primary transfer roller 5G acts on the toner image, and the toner image on the photoreceptor 1G is transferred onto the intermediate transfer belt 20. The transfer bias applied at this time has a (+) polarity opposite to the (−) polarity of the toner, and is controlled to, for example, +10 μA by the control section (not illustrated) in the sixth unit 10G.

The photoreceptor 1G from which the toner image has been transferred onto the intermediate transfer belt 20 continues rotating and comes into contact with a cleaning blade provided in the photoreceptor cleaning device 6G. Toner remaining on the photoreceptor 1G is removed and collected by the photoreceptor cleaning device 6G.

The intermediate transfer belt 20 is sequentially conveyed through the first to sixth image forming units 10P, 10Y, 10M, 10C, 10K, and 10G, and the toner images of the respective colors are transferred in a superimposed manner.

The intermediate transfer belt 20 on which the toner images of six colors are transferred in a superimposed manner while passing through the first to sixth units reaches a secondary transfer portion constituted by the intermediate transfer belt 20, the counter roller 24 in contact with the inner surface of the intermediate transfer belt, and a secondary transfer roller (an example of the secondary transfer means) 26 disposed on the image holding surface side of the intermediate transfer belt 20. Meanwhile, a recording sheet (an example of the recording medium) P is fed to the gap between the second transfer roller 26 and the intermediate transfer belt 20 in contact with each other at predetermined timing via a supply mechanism, and a secondary transfer bias is applied to the counter roller 24. The transfer bias applied at this time has the same (−) polarity as the (−) polarity of the toner, and the electrostatic force directed from the intermediate transfer belt 20 toward the recording sheet P acts on the toner image, and the toner image on the intermediate transfer belt 20 is transferred onto the recording sheet P. The secondary transfer bias at this time is determined in accordance with the resistance detected by resistance detecting means (not illustrated) that detects the resistance of the secondary transfer portion, and is voltage-controlled.

The intermediate transfer belt 20 from which the toner image has been transferred onto the recording sheet P continues running, and comes into contact with a cleaning blade provided in the intermediate transfer member cleaning device 21. The toner remaining on the intermediate transfer belt 20 is removed and collected by the intermediate transfer member cleaning device 21.

The recording sheet P on which the toner image has been transferred is fed into a pressure-contact portion (nip portion) between a pair of fixing rollers in a fixing device (an example of the fixing means) 28, and the toner image is fixed onto the recording sheet P, thereby forming a fixed image.

Examples of the recording sheet P onto which the toner image is transferred include plain paper used in electrophotographic copying machines, printers, and the like. Examples of the recording medium include an OHP sheet in addition to the recording sheet P.

In order to further improve the smoothness of the image surface after fixing, the surface of the recording sheet P is also preferably smooth, and for example, coated paper obtained by coating the surface of plain paper with a resin or the like, art paper for printing, and the like are suitably used.

The recording sheet P on which the color image has been fixed is carried out toward a discharge section, and a series of color image forming operations is finished.

<Process Cartridge and Toner Cartridge>

The process cartridge according to the present exemplary embodiment will be described.

The process cartridge according to the present exemplary embodiment is a process cartridge, which includes developing means that accommodates the electrostatic charge image developer according to the present exemplary embodiment and develops an electrostatic charge image formed on the surface of an image holding member into a toner image with the electrostatic charge image developer, and is detachably attached to an image forming apparatus.

The process cartridge according to the present exemplary embodiment is not limited to the above configuration, and may be configured to include developing means and, if necessary, for example, at least one selected from other means such as an image holding member, charging means, electrostatic charge image forming means, and transfer means.

Hereinafter, an example of the process cartridge according to the present exemplary embodiment will be described, but the process cartridge is not limited thereto. In the following description, main parts illustrated in the drawings will be described, and description of the other parts will be omitted.

Figure 2:
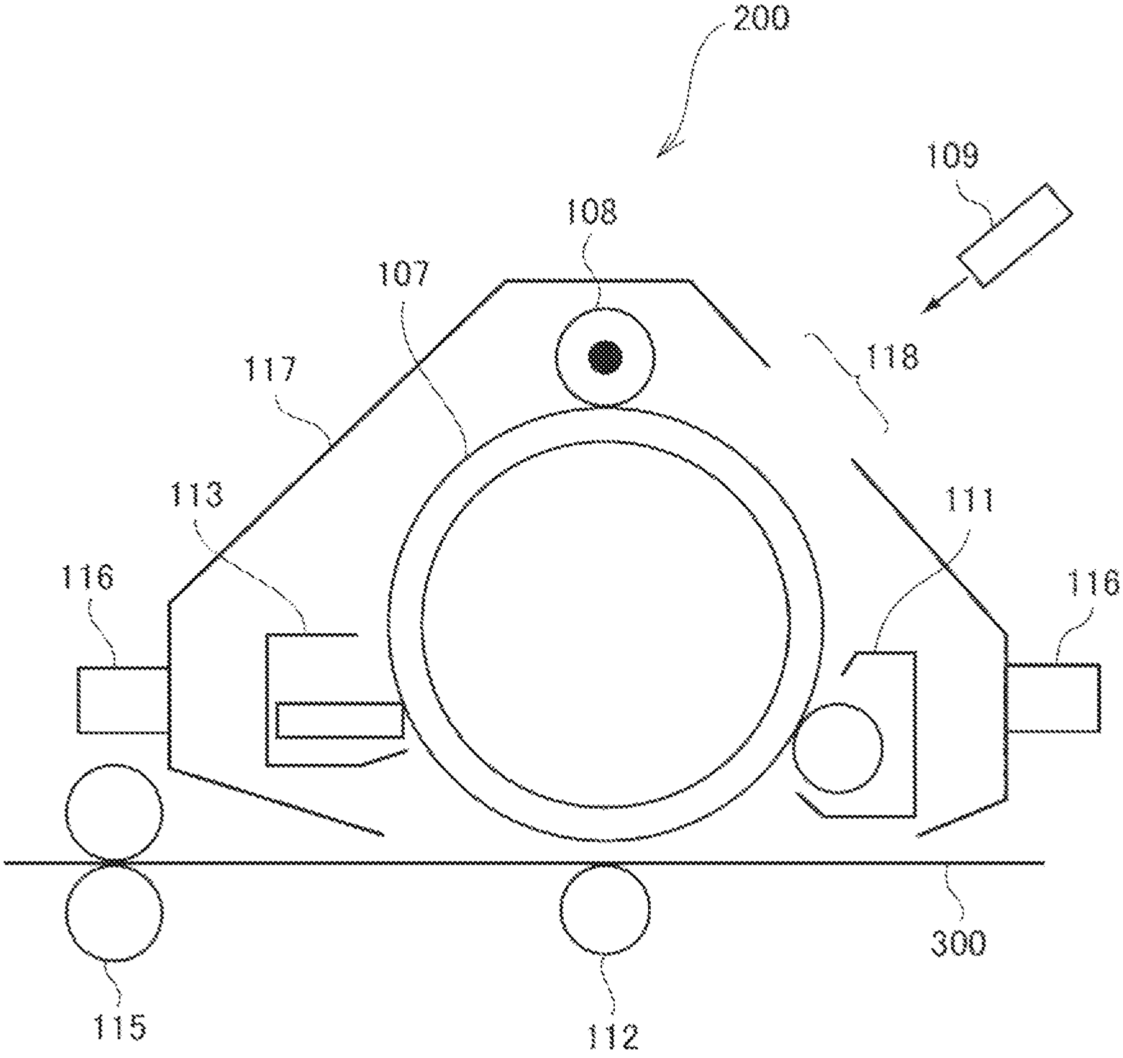
FIG. 2 is a schematic configurational diagram illustrating an example of a process cartridge to be detachably attached to an image forming apparatus according to the present exemplary embodiment.

FIG. 2 is a schematic configurational diagram illustrating the process cartridge according to the present exemplary embodiment.

A process cartridge 200 illustrated in FIG. 2 is configured as a cartridge, for example, by integrally combining and holding a photoreceptor 107 (an example of the image holding member), a charging roller 108 (an example of the charging means) provided around the photoreceptor 107, a developing device 111 (an example of the developing means), and a photoreceptor cleaning device 113 (an example of the cleaning means) in a housing 117 provided with attachment rails 116 and an opening 118 for exposure.

In FIG. 2, 109 denotes an exposure device (an example of the electrostatic charge image forming means), 112 denotes a transfer device (an example of the transfer means), 115 denotes a fixing device (an example of the fixing means), and 300 denotes a recording sheet (an example of the recording medium).

Next, the toner cartridge according to the present exemplary embodiment is described.

The toner cartridge according to the present exemplary embodiment is a toner cartridge which accommodates the green toner according to the present exemplary embodiment and is detachably attached to an image forming apparatus. The toner cartridge accommodates replenishment toner to be supplied to the developing means provided in the image forming apparatus.

The image forming apparatus illustrated in FIG. 1 is an image forming apparatus having a configuration in which the toner cartridges 8Y, 8P, 8M, 8C, 8G, and 8K are detachably attached, and the developing devices 4Y, 4P, 4M, 4C, 4G, and 4K are connected to the toner cartridges corresponding to the respective colors by toner supplying tubes (not illustrated). In a case where the amount of toner accommodated in the toner cartridge becomes small, the toner cartridge is replaced. An example of the toner cartridge according to the present exemplary embodiment is a toner cartridge 8G in which the green toner according to the present exemplary embodiment is accommodated. The toner cartridges 8P, 8Y, 8M, 8C, and 8K accommodate pink, yellow, magenta, cyan, and black toners, respectively.

EXAMPLES

Hereinafter, exemplary embodiments of the present disclosure will be described in detail with reference to Examples, but the exemplary embodiments of the present disclosure are not limited to these Examples.

In the following description, unless otherwise particularly stated, "parts" and "%" are based on mass.

Synthesis, treatment, production, and the like are performed at room temperature (25° C.±3° C.) unless otherwise stated.

<Production of Carrier>

Cyclohexyl methacrylate (weight average molecular weight: 50000): 54 parts

Carbon black (Cabot Corporation, VXC72): 6 parts

Toluene: 250 parts

Isopropyl alcohol: 50 parts

The above materials and glass beads (1 mm in diameter, the same amount as that of toluene) are placed in a sand mill and stirred at a rotation speed of 190 rpm for 30 minutes to obtain a coating agent.

In a kneader, 1000 parts of ferrite particles (volume average particle size: 35 μm) and 150 parts of the coating agent are placed and mixed at room temperature (25° C.) for 20 minutes. The mixture is then heated to 70° C. and dried under reduced pressure. The dry product is cooled to room temperature (25° C.), taken out from the kneader, and sieved through a mesh having an opening of 75 μm to remove coarse powder, thereby obtaining a carrier.

<Production of Oil-Treated Silica Particles>

[Oil-Treated Silica Particles (1)]

$SiCl_4$, a hydrogen gas, and an oxygen gas are mixed in the mixing chamber of a combustion burner and then burned at a temperature of 1000° C. to 3000° C. A silica powder is taken out from the gas after combustion to obtain silica particles. At this time, the molar ratio of the hydrogen gas to the oxygen gas is set to 1.35:1, thereby obtaining silica particles (1) having an average primary particle size of 100 nm.

Into an evaporator, 100 parts of the silica particles (1) and 500 parts of ethanol are put, and the mixture is stirred for 15 minutes while the temperature is maintained at 40° C. Next, 10 parts of dimethyl silicone oil is added, stirring is performed for 15 minutes, 15 parts of dimethyl silicone oil is further added, and stirring is performed for 15 minutes. Next, the temperature is raised to 90° C., the ethanol is dried under reduced pressure, and furthermore, vacuum drying is performed at 120° C. for 30 minutes. Thus, oil-treated silica particles (1) are obtained.

[Oil-Treated Silica Particles (2)]

Silica particles (2) having an average primary particle size of 20 nm are obtained in the same manner as the silica particles (1) except that the molar ratio of the hydrogen gas to the oxygen gas is changed to 1.55:1.

The silica particles (2) are subjected to the same treatment as that for the oil-treated silica particles (1) to obtain oil-treated silica particles (2).

[Oil-Treated Silica Particles (3)]

Silica particles (3) having an average primary particle size of 195 nm are obtained in the same manner as the silica particles (1) except that the molar ratio of the hydrogen gas to the oxygen gas is changed to 1.28:1.

The silica particles (3) are subjected to the same treatment as that for the oil-treated silica particles (1) to obtain oil-treated silica particles (3).

[Oil-Treated Silica Particles (4)]

Into an evaporator, 100 parts of the silica particles (1) and 500 parts of ethanol are put, and the mixture is stirred for 15 minutes while the temperature is maintained at 40° C. Next, 5 parts of dimethyl silicone oil is added, stirring is performed for 15 minutes, 5 parts of dimethyl silicone oil is further added, and stirring is performed for 15 minutes. Next, the temperature is raised to 90° C., the ethanol is dried under reduced pressure, and vacuum drying is further performed at 120° C. for 30 minutes. Thus, oil-treated silica particles (4) are obtained.

[Oil-Treated Silica Particles (5)]

Into an evaporator, 100 parts of the silica particles (1) and 500 parts of ethanol are put, and the mixture is stirred for 15 minutes while the temperature is maintained at 40° C. Next, 15 parts of dimethyl silicone oil is added, stirring is performed for 15 minutes, 25 parts of dimethyl silicone oil is further added, and stirring is performed for 15 minutes. Next, the temperature is raised to 90° C., the ethanol is dried under reduced pressure, and vacuum drying is further performed at 120° C. for 30 minutes. Thus, oil-treated silica particles (5) are obtained.

Example 1: Green Toner and Green Developer

[Preparation of Resin Particle Dispersion (1)]

Terephthalic acid: 30 parts by mole

Fumaric acid: 70 parts by mole

Bisphenol A ethylene oxide adduct: 5 parts by mole

Bisphenol A propylene oxide adduct: 95 parts by mole

A flask equipped with a stirrer, a nitrogen inlet tube, a temperature sensor, and a rectifying column is charged with the above materials, and the temperature is raised to 220° C. over 1 hour. After it is confirmed that the inside of the reaction system is uniformly stirred, 1 part of titanium tetraethoxide is added with respect to 100 parts of the above materials. The temperature is raised to 230° C. over 30 minutes while generated water is distilled off. Stirring is continuously performed at a temperature of 230° C. for 1 hour, and then the inside of the reaction system is cooled to room temperature. Thus, an amorphous polyester resin (weight average molecular weight: 18,000, glass transition temperature: 60° C.) is obtained.

After 40 parts of ethyl acetate and 25 parts of 2-butanol are put into a reaction vessel equipped with temperature control means and nitrogen purging means and mixed, 100 parts of the amorphous polyester resin is gradually added and dissolved. Subsequently, 3 molar equivalents of a 10% aqueous ammonia solution with respect to the acid value of the amorphous polyester resin is added, and the mixture is stirred for 30 minutes. Next, the inside of the reaction vessel is purged with dry nitrogen, and 400 part of ion-exchanged water is added dropwise at a rate of 2 parts/min while the temperature is maintained at 40° C. and stirring is performed to prepare a resin particle dispersion. The resin particle dispersion is cooled to room temperature and bubbled with a dry nitrogen gas for 48 hours while stirring is performed to decrease the concentrations of ethyl acetate and 2-butanol to 1000 ppm or less. Ion-exchanged water is added to the resin particle dispersion to obtain a resin particle dispersion (1) having a solid content of 20%.

[Preparation of Release Agent Particle Dispersion (1)]

Paraffin wax (HNP-9, NIPPON SEIRO CO., LTD.): 100 parts

Anionic surfactant (NEOGEN RK, DKS Co. Ltd.): 1 part

Ion-exchanged water: 350 parts

The above materials are mixed, heated to 100° C., dispersed using a homogenizer (ULTRA-TURRAX T50, IKA), and then dispersed using a pressure-discharge homogenizer (Gaulin). When the volume average particle size reaches 200 nm, collection is performed to obtain a release agent particle dispersion (1) having a solid content of 20%.

[Preparation of Pigment Dispersion (Y101)]

C.I. Pigment Yellow 101:70 parts

Anionic surfactant (NEOGEN RK, DKS Co. Ltd.): 30 parts (solid content: 20%)

Ion-exchanged water: 200 parts

The above materials are mixed and pulverized using a continuous key mill (KMC-3, INOUE MFG., INC.) until the volume average particle size reaches 300 nm. The solid content is adjusted to 20% to obtain a pigment dispersion (Y101).

[Preparation of Pigment Dispersion (PG36)]

C.I. Pigment Green 36:70 parts

Anionic surfactant (NEOGEN RK, DKS Co. Ltd.): 30 parts (solid content: 20%)

Ion-exchanged water: 200 parts

The above materials are mixed and pulverized using a continuous key mill (KMC-3, INOUE MFG., INC.) until the volume average particle size reaches 150 nm. The solid content is adjusted to 20% to obtain a pigment dispersion (PG36).

[Preparation of Green Toner Particles]

Resin particle dispersion (1): 560 parts (solid content: 20%)

Release agent particle dispersion (1): 30 parts (solid content: 20%)

Pigment dispersion (Y101): 70 parts (solid content: 20%)

Pigment dispersion (PG36): 30 parts (solid content: 20%)

Anionic surfactant (NEOGEN RK, DKS Co. Ltd.): 12 parts (solid content: 20%)

The above materials are placed in a round stainless steel flask, the pH is adjusted to 3.5 by addition of 0.1 mol/L nitric add, and 30 parts of nitric acid having a polyaluminum chloride concentration of 10% is added. The liquid temperature is adjusted to 30° C., dispersion treatment is performed using a homogenizer (ULTRA-TURRAX T50, IKA), and the mixture is heated to 45° C. in a heating oil bath while the inside of the flask is stirred, and held for 30 minutes. Next, 50 parts of the resin particle dispersion (1) (solid content: 20%) are further added, the mixture is held for 1 hour, then the pH is adjusted to 8.5 using a 0.1 mol/L aqueous sodium hydroxide solution, and the mixture is heated to 84° C. while stirring is continuously performed, and held for 2.5 hours. Next, the mixture is cooled to room temperature at a rate of 20° C./min and subjected to solid-liquid separation, and washing with ion-exchanged water is sufficiently performed. The solids are vacuum-dried to obtain green toner particles (1). The volume average particle size of the green toner particles (1) is 5.8 μm.

[Preparation of Green Toner and Green Developer]

In a sample mill, 100 parts of the green toner particles (1), 2.0 parts of the oil-treated silica particles (1), and 1.0 part of hydrophobic titanium dioxide particles (T805, Nippon Aerosil Co., Ltd.) are placed, and mixed at a rotation speed of 10000 rpm for 30 seconds. Thereafter, the mixture is sieved through a vibration sieve having an opening of 45 μm to obtain a toner with external additives.

In a V-blender, 10 parts of the toner with external additives and 100 parts of the carrier are placed, and stirred for 20 minutes. Thereafter, the mixture is sieved through a sieve having an opening of 212 μm to obtain a green developer.

Examples 2 and 3

Green toner particles, green toners, and green developers are produced in the same manner as in Example 1 except that the amount of the pigment dispersion used is changed in the production of the green toner particles.

Example 4

Green toner particles, a green toner, and a green developer are produced in the same manner as in Example 1 except that C.I. Pigment Green 36 is replaced with C.I. Pigment Green 59 in the production of the green toner particles.

Comparative Example 1

Green toner particles, a green toner, and a green developer are produced in the same manner as in Example 1 except that 2.0 parts of the oil-treated silica particles (1) are replaced with 2.0 parts of the silica particles (1).

Comparative Example 2

Green toner particles, a green toner, and a green developer are produced in the same manner as in Example 1 except that the oil-treated silica particles (1) are not externally added.

Comparative Examples 3 and 4

Green toner particles, green toners, and green developers are produced in the same manner as in Example 1 except that the amount of the pigment dispersion used is changed in the production of the green toner particles and the oil-treated silica particles (1) are not externally added.

Comparative Examples 5 to 7

Green toner particles, green toners, and green developers are produced in the same manner as in Example 1 except that the amount of the pigment dispersion used is changed in the production of the green toner particles.

Example 5

Green toner particles, a green toner, and a green developer are produced in the same manner as in Example 1 except that the rotation speed of the sample mill is changed to 15000 rpm during mixing of the green toner particles and the external additives.

Example 6

Green toner particles, a green toner, and a green developer are produced in the same manner as in Example 1 except that the rotation speed of the sample mill is changed to 5000 rpm during mixing of the green toner particles and the external additives.

Examples 7 and 8

Green toner particles, green toners, and green developers are produced in the same manner as in Example 1 except that the kind and amount of the oil-treated silica particles externally added are changed to the specifications listed in Table 1.

Examples 9 and 10

Green toner particles, green toners, and green developers are produced in the same manner as in Example 1 except that the kind of the oil-treated silica particles is changed to the specifications listed in Table 1.

Examples 11 to 15

Green toner particles, green toners, and green developers are produced in the same manner as in Example 1 except that the particle size of the fluorescent pigment and/or the particle size of the non-fluorescent pigment are changed to the specifications listed in Table 1. The particle size of the pigment is controlled by the treatment time using a continuous key mill during preparation of the pigment dispersion.

Comparative Examples 8 to 10

Green toner particles, green toners, and green developers are produced in the same manner as in Example 1 except that the particle size of the fluorescent pigment and/or the particle size of the non-fluorescent pigment are changed to the specifications listed in Table 1 and the oil-treated silica particles (1) are not externally added. The particle size of the pigment is controlled by the treatment time using a continuous key mill during preparation of the pigment dispersion. In Comparative Example 10, 2.0 parts of the oil-treated silica particles (1) is replaced with 2.0 parts of the silica particles (1).

<Performance Evaluation>

[Color Difference ΔE from Color Sample]

A modified machine of DocuCentreColor 400CP (FUJIFILM Business Innovation Corp.) is prepared, a developer is placed in the developing device, and a toner is placed in the toner cartridge.

In an environment at a temperature of 25° C. and a relative humidity of 60%, a green monochrome solid image (density: 100%, size: 5 cm×5 cm, applied toner amount: 4.0 g/m$^2$) is formed on coated A4 paper (OS coated paper, 127 g/m$^2$, FUJIFILM Business Innovation Corp.). The fixing temperature is set to 180° C.

Using a reflection spectrodensitometer X-Rite 939 (aperture diameter: 4 mm, X-Rite, Incorporated), the L* value, a* value, and b* value in the CIE 1976 L*a*b* color space are measured at 10 positions in the solid image, and the average values of the L* value, a* value, and b* value are calculated.

A color difference ΔE between the solid image and the color sample TOKA FLASH VIVA DX 650 (T&K TOKA Corporation) is calculated according to the following equation. The results are presented in Table 1.

$$\Delta E=\sqrt{(L_1-L_2)^2+(a_1-a_2)^2+(b_1-b_2)^2}$$

$L_1$, $a_1$, and $b_1$ are the L* value, a* value, and b* value of the color sample TOKA FLASH VIVA DX 650, and $L_2$, $a_2$, and $b_2$ are the L* value, a* value, and b* value of the solid image of Example. The color sample TOKA FLASH VIVA DX 650 has an L* value of 77.7, an a* value of −69.0, and a b* value of 65.9.

[Reflectance]

A modified machine of DocuCentreColor 400CP (FUJIFILM Business Innovation Corp.) is prepared, a developer is placed in the developing device, and a toner is placed in the toner cartridge.

In an environment at a temperature of 25° C. and a relative humidity of 60%, a green monochrome solid image (density: 100%, size: 5 cm×5 cm, applied toner amount: 4.0 g/m$^2$) is formed on coated A4 paper (OS coated paper, 127 g/m$^2$, FUJIFILM Business Innovation Corp.).

Using a reflection spectrodensitometer X-Rite 939 (aperture diameter: 4 mm, X-Rite, Incorporated), the spectral reflectance (measured wavelength range: 400 nm to 700 nm) is measured at 10 positions in the solid image. The average values of reflectances of the reflection peaks are calculated and classified as follows.

A: Reflectance of reflection peak is 80% or more

B: Reflectance of reflection peak is 70% or more and less than 80%

C: Reflectance of reflection peak is less than 70%

[Fogging]

A modified machine of DocuCentreColor 400CP (FUJIFILM Business Innovation Corp.) is prepared, a developer is placed in the developing device, and a toner is placed in the toner cartridge.

The image forming apparatus is left to stand in an environment at a temperature of 28° C. and a relative humidity of 85% for 1 day, and then an image having a density of 40% is output on 100,000 sheets of plain A4 paper in the same environment.

Using a reflection spectrodensitometer X-Rite 938 (X-Rite, Incorporated), the density at a position (one position per sheet) where fogging is likely to occur in the non-image area of the last 10 sheets is measured, and the density difference ΔE between the highest density among these and the density of plain paper is calculated. The density difference ΔE is classified as follows.

G1: Density difference ΔE is less than 0.1

G2: Density difference ΔE is 0.1 or more and less than 0.2

G3: Density difference ΔE is 0.2 or more and less than 0.3

G4: Density difference ΔE is 0.3 or more

[Fixing Offset]

A modified machine of DocuCentreColor 400CP (FUJIFILM Business Innovation Corp.) is prepared, a developer is placed in the developing device, and a toner is placed in the toner cartridge.

The fixing device removed from ApeosPort IV C3370 (FUJIFILM Business Innovation Corp.) is modified to fabricate a fixing device in which the fixing temperature can be freely set.

In an environment at a temperature of 25° C. and a relative humidity of 60%, a green monochrome solid image (density: 100%, size: 5 cm×5 cm, applied toner amount: 4.5 g/m$^2$) is formed as an unfixed image on a film synthetic paper (YUPO PAPER, YUPO CORPORATION) and allowed to pass through the fixing device. The nip width of the fixing device is set to 6 mm, the nip thickness is set to 1.6 kgf/cm$^2$, the process speed is set to 175 mm/sec, and the fixing temperature is set to from 160° C. to 220° C. at intervals of 5° C.

The fixed image is visually observed to examine the presence or absence of offset (a phenomenon in which the toner image adheres to the fixing member and peels off from the recording medium). Classification is performed as follows based on the lowest temperature at which offset occurs.

A: Offset does not occur, or the offset occurring temperature is 200° C. or more B: Offset occurring temperature is 170° C. or more and less than 200° C.

C: Offset occurring temperature is less than 170° C.

The symbols in Table 1 mean the following pigments.

PY101: C.I. Pigment Yellow 101 (Radiant Color, Radglo VSF-0-01, emission peak: 520 nm), one of azomethine fluorescent pigments (Y)

PG36: C.I. Pigment Green 36 (Toyo Color, LIONOL GREEN 8624, reflection peak: 510 nm), one of pigments (G)

PG59: C.I. Pigment Green 59 (DIC CORPORATION, FASTOGEN GREEN C100, reflection peak: 520 nm), one of pigments (G)

TABLE 1

| | Green toner particles | | | | | | | | Oil-treated silica particles | |
|---|---|---|---|---|---|---|---|---|---|---|
| | Fluorescent pigment | | | Non-fluorescent pigment | | | Fluorescent pigment/non-fluorescent pigment | | | Average primary particle |
| | Kind | Particle size D1 | Content M1 % by mass | Kind | Particle size D2 | Content M2 % by mass | D1/D2 | M1/M2 | Kind | size |
| | — | nm | | — | nm | | — | — | — | nm |
| Comparative Example 1 | PY101 | 300 | 7.0 | PG36 | 150 | 3.0 | 2.0 | 2.3 | — | — |
| Comparative Example 2 | PY101 | 300 | 7.0 | PG36 | 150 | 3.0 | 2.0 | 2.3 | — | — |
| Comparative Example 3 | PY101 | 300 | 3.5 | PG36 | 150 | 3.0 | 2.0 | 1.2 | — | — |
| Comparative Example 4 | PY101 | 300 | 7.0 | PG36 | 150 | 1.5 | 2.0 | 4.7 | — | — |
| Example 1 | PY101 | 300 | 7.0 | PG36 | 150 | 3.0 | 2.0 | 2.3 | (1) | 100 |
| Example 2 | PY101 | 300 | 3.5 | PG36 | 150 | 3.0 | 2.0 | 1.2 | (1) | 100 |
| Example 3 | PY101 | 300 | 7.0 | PG36 | 150 | 1.5 | 2.0 | 4.7 | (1) | 100 |
| Example 4 | PY101 | 300 | 7.0 | PG59 | 164 | 3.0 | 1.8 | 2.3 | (1) | 100 |
| Comparative Example 5 | PY101 | 300 | 2.8 | PG36 | 150 | 2.5 | 2.0 | 1.1 | (1) | 100 |
| Comparative Example 6 | PY101 | 300 | 11.0 | PG36 | 150 | 3.0 | 2.0 | 3.7 | (1) | 100 |
| Comparative Example 7 | PY101 | 300 | 7.0 | PG36 | 150 | 1.0 | 2.0 | 7.0 | (1) | 100 |
| Example 5 | PY101 | 300 | 7.0 | PG36 | 150 | 3.0 | 2.0 | 2.3 | (1) | 100 |
| Example 6 | PY101 | 300 | 7.0 | PG36 | 150 | 3.0 | 2.0 | 2.3 | (1) | 100 |
| Example 7 | PY101 | 300 | 7.0 | PG36 | 150 | 3.0 | 2.0 | 2.3 | (2) | 20 |
| Example 8 | PY101 | 300 | 7.0 | PG36 | 150 | 3.0 | 2.0 | 2.3 | (3) | 195 |
| Example 9 | PY101 | 300 | 7.0 | PG36 | 150 | 3.0 | 2.0 | 2.3 | (4) | 100 |
| Example 10 | PY101 | 300 | 7.0 | PG36 | 150 | 3.0 | 2.0 | 2.3 | (5) | 100 |
| Example 11 | PY101 | 880 | 7.0 | PG36 | 150 | 3.0 | 5.9 | 2.3 | (1) | 100 |
| Example 12 | PY101 | 680 | 7.0 | PG36 | 150 | 3.0 | 4.5 | 2.3 | (1) | 100 |
| Comparative Example 8 | PY101 | 680 | 7.0 | PG36 | 150 | 3.0 | 4.5 | 2.3 | — | — |
| Example 13 | PY101 | 200 | 7.0 | PG36 | 230 | 3.0 | 0.9 | 2.3 | (1) | 100 |
| Example 14 | PY101 | 100 | 7.0 | PG36 | 80 | 3.0 | 1.3 | 2.3 | (1) | 100 |
| Comparative Example 9 | PY101 | 100 | 7.0 | PG36 | 80 | 3.0 | 1.3 | 2.3 | — | — |
| Example 15 | PY101 | 27 | 7.0 | PG36 | 24 | 3.0 | 1.1 | 2.3 | (1) | 100 |
| Comparative Example 10 | PY101 | 27 | 7.0 | PG36 | 24 | 3.0 | 1.1 | 2.3 | — | — |

| | Oil-treated silica particles | | | Non-oil-treated silica particles | | Green toner | | | |
|---|---|---|---|---|---|---|---|---|---|
| | Externally added amount Parts by mass | Free oil % by mass | Weakly attached proportion % by mass | Externally added amount Parts by mass | Average primary particle size nm | ΔE | Reflectance | Fogging | Fixing offset |
| | | | | | | — | — | — | — |
| Comparative Example 1 | 0 | — | — | 2 | 100 | 10 | A | G3 | A |
| Comparative Example 2 | 0 | — | — | 0 | — | 9 | A | G3 | A |
| Comparative Example 3 | 0 | — | — | 0 | — | 8 | A | G3 | A |
| Comparative Example 4 | 0 | — | — | 0 | — | 12 | A | G3 | A |
| Example 1 | 2 | 20 | 30 | 0 | — | 9 | A | G1 | A |
| Example 2 | 2 | 20 | 30 | 0 | — | 8 | A | G1 | A |
| Example 3 | 2 | 20 | 30 | 0 | — | 12 | A | G1 | A |
| Example 4 | 2 | 20 | 30 | 0 | — | 9 | A | G1 | A |
| Comparative Example 5 | 2 | 20 | 30 | 0 | — | 11 | C | G1 | A |
| Comparative Example 6 | 2 | 20 | 30 | 0 | — | 19 | A | G1 | A |
| Comparative Example 7 | 2 | 20 | 30 | 0 | — | 17 | A | G1 | A |
| Example 5 | 2 | 21 | 22 | 0 | — | 9 | A | G2 | A |
| Example 6 | 2 | 19 | 39 | 0 | — | 9 | A | G2 | A |
| Example 7 | 0.8 | 21 | 31 | 0 | — | 9 | A | G2 | A |
| Example 8 | 3 | 19 | 30 | 0 | — | 9 | A | G2 | A |
| Example 9 | 2 | 6 | 32 | 0 | — | 9 | A | G2 | A |
| Example 10 | 2 | 29 | 29 | 0 | — | 9 | A | G2 | A |
| Example 11 | 2 | 20 | 30 | 0 | — | 10 | A | G1 | C |
| Example 12 | 2 | 20 | 30 | 0 | — | 10 | A | G1 | B |
| Comparative Example 8 | 0 | — | — | 0 | — | 10 | A | G3 | B |
| Example 13 | 2 | 20 | 30 | 0 | — | 9 | A | G1 | C |
| Example 14 | 2 | 20 | 30 | 0 | — | 10 | A | G1 | B |
| Comparative Example 9 | 0 | — | — | 0 | — | 10 | A | G3 | B |
| Example 15 | 2 | 20 | 30 | 0 | — | 12 | A | G1 | C |
| Comparative Example 10 | 0 | — | — | 2 | 100 | 13 | A | G3 | C |

<Image Formation Using Actual Machine>

A six unit tandem-type image forming apparatus of an electrophotographic type and an intermediate transfer type is prepared. Six developing devices are filled with a pink developer, a yellow developer, a magenta developer, a cyan developer, a black developer, and a green developer (the developer of Example 1), respectively. Then, an image is formed on coated A4 paper on the basis of image date obtained by color-separating RGB date into the six colors. An image having favorable color reproducibility close to the original RGB data is obtained.

The green toner for electrostatic charge image development, the electrostatic charge image developer, the toner cartridge, the process cartridge, the image forming apparatus, and the image forming method of the present disclosure include the following aspects.

APPENDIX (((1))) A green toner for electrostatic charge image development, comprising:

green toner particles containing a binder resin, an azomethine fluorescent pigment having an emission peak in a wavelength region of 500 nm or more and 550 nm or less in an emission spectrum, and a non-fluorescent pigment having a reflection peak in a wavelength region of 480 nm or more and 540 nm or less in a reflection spectrum, wherein a mass proportion of the azomethine fluorescent pigment in the green toner particles is 3% by mass or more and 10% by mass or less and a mass ratio M1/M2 of a content M1 of the azomethine fluorescent pigment to a content M2 of the non-fluorescent pigment is 1 or more and 5 or less; and oil-treated silica particles externally added to the green toner particles.

(((2))) The green toner for electrostatic charge image development according to (((1))), wherein the oil-treated silica particles are oil-treated silica particles having a free oil amount of 5% by mass or more and 30% by mass or less.

(((3))) The green toner for electrostatic charge image development according to (((1))) or (((2))), wherein the oil-treated silica particles detached from the green toner particles account for 20% by mass or more and 40% by mass or less of the oil-treated silica particles externally added to the green toner particles when the green toner for electrostatic charge image development is dispersed in water containing a surfactant and sonicated at a power of 20 W and a frequency of 20 kHz for 1 minute.

(((4))) The green toner for electrostatic charge image development according to any one of (((1))) to (((3))), wherein the oil-treated silica particles have an average primary particle size of 15 nm or more and 200 nm or less.

(((5) The green toner for electrostatic charge image development according to any one of (((1))) to (((4))), wherein the oil-treated silica particles are silicone oil-treated silica particles.

(((6))) The green toner for electrostatic charge image development according to any one of (((1))) to (((5))), wherein the oil-treated silica particles are contained in an amount of 0.5 parts by mass or more and 5 parts by mass or less with respect to 100 parts by mass of the green toner particles.

(((7))) The green toner for electrostatic charge image development according to any one of (((1))) to (((6))), wherein a volume average particle size D1 of the azomethine fluorescent pigment is 30 nm or more and 800 nm or less, and the volume average particle size D1 of the azomethine fluorescent pigment and a volume average particle size D2 of the non-fluorescent pigment satisfy a relation of D1>D2.

(((8))) The green toner for electrostatic charge image development according to any one of (((1))) to (((7))), wherein the azomethine fluorescent pigment is C.I. Pigment Yellow 101.

(((9))) The green toner for electrostatic charge image development according to any one of (((1))) to (((8))), wherein the non-fluorescent pigment is at least one selected from the group consisting of C.I. Pigment Green 7, C.I. Pigment Green 36, C.I. Pigment Green 58, C.I. Pigment Green 59, and C.I. Pigment Blue 76.

(((10))) An electrostatic charge image developer comprising the green toner for electrostatic charge image development according to any one of (((1))) to (((9))), (((11))) A toner cartridge comprising the green toner for electrostatic charge image development according to any one of (((1))) to (((9))), the toner cartridge being detachably attached to an image forming apparatus.

(((12))) A process cartridge comprising:

developing means that accommodates the electrostatic charge image developer according to (((10))) and develops an electrostatic charge image formed on a surface of an image holding member into a toner image with the electrostatic charge image developer, the process cartridge being detachably attached to an image forming apparatus.

(((13))) An image forming apparatus comprising:

an image holding member;

charging unit that charges a surface of the image holding member;

electrostatic charge image forming unit that forms an electrostatic charge image on the charged surface of the image holding member;

developing unit that contains the electrostatic charge image developer according to (((10))) and develops the electrostatic charge image formed on the surface of the image holding member into a toner image with the electrostatic charge image developer;

transfer unit that transfers the toner image formed on the surface of the image holding member onto a surface of a recording medium; and fixing unit that fixes the toner image transferred on the surface of the recording medium.

(((14))) An image forming method comprising:

charging a surface of an image holding member;

forming an electrostatic charge image on the charged surface of the image holding member;

developing the electrostatic charge image formed on the surface of the image holding member into a toner image with the electrostatic charge image developer according to (((10)));

transferring the toner image formed on the surface of the image holding member onto a surface of a recording medium; and fixing the toner image transferred on the surface of the recording medium.

(((15))) An image forming apparatus comprising:

first to sixth electrophotographic image forming units that form images in respective colors of pink, yellow, magenta, cyan, black, and green, wherein the image forming unit that forms the green image accommodates the electrostatic charge image developer according to (((10))).

(((16))) An image forming method comprising:

first to sixth electrophotographic image forming steps of forming images in respective colors of pink, yellow, magenta, cyan, black, and green, wherein the electrostatic charge image developer according to (((10))) is used in the image forming step of forming the green image.

What is claimed is:

1. A green toner for electrostatic charge image development, comprising:

green toner particles containing a binder resin, an azomethine fluorescent pigment having an emission peak in a wavelength region of 500 nm or more and 550 nm or less in an emission spectrum, and a non-fluorescent pigment having a reflection peak in a wavelength region of 480 nm or more and 540 nm or less in a reflection spectrum, wherein a mass proportion of the azomethine fluorescent pigment in the green toner particles is 3% by mass or more and 10% by mass or less and a mass ratio M1/M2 of a content M1 of the azomethine fluorescent pigment to a content M2 of the non-fluorescent pigment is 1 or more and 5 or less; and oil-treated silica particles externally added to the green toner particles.

2. The green toner for electrostatic charge image development according to claim 1, wherein the oil-treated silica particles are oil-treated silica particles having a free oil amount of 5% by mass or more and 30% by mass or less.

3. The green toner for electrostatic charge image development according to claim 1, wherein the oil-treated silica particles detached from the green toner particles account for 20% by mass or more and 40% by mass or less of the oil-treated silica particles externally added to the green toner particles when the green toner for electrostatic charge image development is dispersed in water containing a surfactant and sonicated at a power of 20 W and a frequency of 20 kHz for 1 minute.

4. The green toner for electrostatic charge image development according to claim 1, wherein the oil-treated silica particles have an average primary particle size of 15 nm or more and 200 nm or less.

5. The green toner for electrostatic charge image development according to claim 1, wherein the oil-treated silica particles are silicone oil-treated silica particles.

6. The green toner for electrostatic charge image development according to claim 4, wherein the oil-treated silica particles are silicone oil-treated silica particles.

7. The green toner for electrostatic charge image development according to claim 1, wherein the oil-treated silica particles are contained in an amount of 0.5 parts by mass or more and 5 parts by mass or less with respect to 100 parts by mass of the green toner particles.

8. The green toner for electrostatic charge image development according to claim 1, wherein a volume average particle size D1 of the azomethine fluorescent pigment is 30 nm or more and 800 nm or less, and the volume average particle size D1 of the azomethine fluorescent pigment and a volume average particle size D2 of the non-fluorescent pigment satisfy a relation of D1>D2.

9. The green toner for electrostatic charge image development according to claim 8, wherein the ratio D1/D2 of the volume average particle size D1 to the volume average particle size D2 is more than 1 and 3 or less.

10. The green toner for electrostatic charge image development according to claim 1, wherein the azomethine fluorescent pigment is C.I. Pigment Yellow 101.

11. The green toner for electrostatic charge image development according to claim 1, wherein the non-fluorescent pigment is at least one selected from the group consisting of C.I. Pigment Green 7, C.I. Pigment Green 36, C.I. Pigment Green 58, C.I. Pigment Green 59, and C.I. Pigment Blue 76.

12. An electrostatic charge image developer comprising the green toner for electrostatic charge image development according to claim 1.

13. An electrostatic charge image developer comprising the green toner for electrostatic charge image development according to claim 2.

14. An electrostatic charge image developer comprising the green toner for electrostatic charge image development according to claim 3.

15. A toner cartridge comprising the green toner for electrostatic charge image development according to claim 1, the toner cartridge being detachably attached to an image forming apparatus.

16. A process cartridge comprising:

a developing unit that contains the electrostatic charge image developer according to claim 12 and develops an electrostatic charge image formed on a surface of an image holding member into a toner image with the electrostatic charge image developer, the process cartridge being detachably attached to an image forming apparatus.

17. An image forming apparatus comprising:

an image holding member;

a charging unit that charges a surface of the image holding member;

an electrostatic charge image forming unit that forms an electrostatic charge image on the charged surface of the image holding member;

a developing unit that contains the electrostatic charge image developer according to claim 12 and develops the electrostatic charge image formed on the surface of the image holding member into a toner image with the electrostatic charge image developer;

a transfer unit that transfers the toner image formed on the surface of the image holding member onto a surface of a recording medium; and a fixing unit that fixes the toner image transferred on the surface of the recording medium.

18. An image forming method comprising:

charging a surface of an image holding member;

forming an electrostatic charge image on the charged surface of the image holding member;

developing the electrostatic charge image formed on the surface of the image holding member into a toner image with the electrostatic charge image developer according to claim 12;

transferring the toner image formed on the surface of the image holding member onto a surface of a recording medium; and fixing the toner image transferred on the surface of the recording medium.

19. An image forming apparatus comprising:

first to sixth electrophotographic image forming units that form images in respective colors of pink, yellow, magenta, cyan, black, and green, wherein the image forming unit that forms the green image accommodates the electrostatic charge image developer according to claim 12.

20. An image forming method comprising:

first to sixth electrophotographic image forming steps of forming images in respective colors of pink, yellow, magenta, cyan, black, and green, wherein the electrostatic charge image developer according to claim 12 is used for forming the green image.

* * * * *